United States Patent
Yanai et al.

(10) Patent No.: US 9,592,689 B2
(45) Date of Patent: Mar. 14, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Yumi Yanai, Yokohama (JP); Masao Kato, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/971,277

(22) Filed: Dec. 16, 2015

(65) Prior Publication Data

US 2016/0167414 A1 Jun. 16, 2016

(30) Foreign Application Priority Data

Dec. 16, 2014 (JP) .................................. 2014-254029

(51) Int. Cl.
*B41J 29/38* (2006.01)
*B41J 2/01* (2006.01)
(Continued)

(52) U.S. Cl.
CPC ................ *B41J 29/38* (2013.01); *B41J 2/01* (2013.01); *B41J 2/2107* (2013.01); *H04N 1/4052* (2013.01); *H04N 1/52* (2013.01)

(58) Field of Classification Search
CPC ... B41J 2/01; B41J 2/2132; B41J 29/38; B41J 2/2054; B41J 2/2056; G06K 15/107; G06K 15/102; H04N 1/4057
See application file for complete search history.

(56) References Cited

U.S. PATENT DOCUMENTS

| 6,738,160 B1 | 5/2004 | Kato |
| 7,099,046 B2 | 8/2006 | Kato |

(Continued)

FOREIGN PATENT DOCUMENTS

| JP | 2004-131586 | 4/2004 |
| JP | 2005-225948 | 8/2005 |
| JP | 2006-335858 | 12/2006 |

OTHER PUBLICATIONS

U.S. Appl. No. 14/971,271, filed Dec. 16, 2015.
(Continued)

*Primary Examiner* — Thinh H Nguyen
(74) *Attorney, Agent, or Firm* — Fitzpatrick, Cella, Harper & Scinto

(57) ABSTRACT

An image processing apparatus for printing an image on a print medium by using a printing unit that ejects a first ink in accordance with first quantized data and ejects a second ink in accordance with second quantized data, the image printing apparatus has a first quantization configured to quantize multi-valued data corresponding to the first ink to generate the first quantized data, the multi-valued data indicating intermediate density; and a second quantization unit configured to quantize multi-valued data corresponding to the second ink to generate the second quantized data, the multi-valued data indicating intermediate density. Surface tension of the first ink is larger than surface tension of the second ink, and a first dot pattern printed on the print medium in accordance with the first quantized data has higher dispersibility than a second dot pattern printed on the print medium in accordance with the second quantized data.

29 Claims, 16 Drawing Sheets

(51) Int. Cl.
*B41J 2/21* (2006.01)
*H04N 1/405* (2006.01)
*H04N 1/52* (2006.01)

(56) References Cited

U.S. PATENT DOCUMENTS

| | | | |
|---|---|---|---|
| 7,258,412 B2 * | 8/2007 | Maru | B41J 2/2107 |
| | | | 347/15 |
| 7,312,901 B2 | 12/2007 | Yamada | |
| 7,548,346 B2 | 6/2009 | Yamada | |
| 7,672,011 B2 | 3/2010 | Kato | |
| 7,855,809 B2 | 12/2010 | Kato | |
| 7,859,723 B2 | 12/2010 | Yamada | |
| 7,965,418 B2 | 6/2011 | Yamada | |
| 8,506,068 B2 * | 8/2013 | Mimura | B41J 2/2114 |
| | | | 347/100 |
| 2015/0178599 A1 * | 6/2015 | Ushiyama | G06K 15/102 |
| | | | 358/1.8 |

OTHER PUBLICATIONS

U.S. Appl. No. 14/971,287, filed Dec. 16, 2015.
U.S. Appl. No. 14/991,618, filed Jan. 8, 2016.
Robert Ulichney, "The void-and-cluster method for dither array generation", Proceedings SPIE, Human Vision, Visual Processing, Digital Displays IV, vol. 1913, pp. 332-343, 1993.

* cited by examiner

FIG.11A THRESHOLD VALUE MATRIX, 262144 PIXELS (512 X 512)

| 2048 | 168 | 1844 | 4087 | 3460 | 210 | 2437 | | 149 | 2922 | 699 | 1887 | 3 | 3400 | 488 |
|---|---|---|---|---|---|---|---|---|---|---|---|---|---|---|
| 3825 | 3245 | 1503 | 430 | 2709 | 1723 | 689 | | 1013 | 1444 | 3495 | 2650 | 4035 | 1494 | 1203 |
| 772 | 2607 | 1132 | 2192 | 837 | 3293 | 2059 | | 2460 | 3833 | 2075 | 418 | 956 | 2405 | 2994 |
| 324 | 1926 | 3658 | 3025 | 3845 | 1415 | 394 | | 1713 | 209 | 1236 | 3228 | 1777 | 3623 | 2124 |
| 1620 | 2853 | 631 | 69 | 2424 | 1089 | 3571 | | 3334 | 3708 | 2328 | 2932 | 719 | 128 | 3306 |
| 4009 | 1028 | 3369 | 1551 | 1896 | 2867 | 202 | | 2004 | 961 | 487 | 1461 | 3907 | 2738 | 1309 |
| 510 | 2521 | 2087 | 3729 | 746 | 3929 | 1453 | | 2532 | 2840 | 3572 | 1923 | 2478 | 857 | 2222 |
| 3105 | 243 | 1293 | 2792 | 417 | 2494 | 3396 | | 4028 | 84 | 1163 | 3210 | 290 | 1653 | 3640 |
| 1860 | 3472 | 824 | 3250 | 2223 | 1195 | 1763 | | 3163 | 1831 | 2303 | 651 | 3821 | 2947 | 1051 |

| 2443 | 2977 | 502 | 2766 | 864 | 303 | 1102 | | 1156 | 720 | 1680 | 4060 | 449 | 1561 | 1059 |
|---|---|---|---|---|---|---|---|---|---|---|---|---|---|---|
| 325 | 3814 | 1205 | 2105 | 3481 | 2428 | 2959 | | 3798 | 1963 | 2991 | 935 | 2520 | 3549 | 3107 |
| 2292 | 1600 | 3379 | 73 | 1650 | 3911 | 1379 | | 2693 | 264 | 3459 | 2090 | 1364 | 195 | 1936 |
| 1147 | 596 | 2633 | 3121 | 738 | 1983 | 384 | | 1248 | 1592 | 512 | 3780 | 2761 | 782 | 3943 |
| 2911 | 3597 | 954 | 2273 | 1249 | 2858 | 3726 | | 3952 | 3262 | 2309 | 1111 | 3129 | 1691 | 2476 |

512 PIXELS × 512 PIXELS

Power Spectrum vs Radial Frequency [cycle/mm]

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, image processing method, and storage medium for printing image data after a quantization process on a print medium using an inkjet print head.

Description of the Related Art

Ink types used for inkjet printing include dye ink containing dye as a color material and pigment ink containing pigment. In general, the pigment ink is superior in light resistance and water resistance to the dye ink, but often inferior in rub resistance. Note that the rub resistance refers to the resistance characteristics of an image printed on a print medium at the time of rubbing the surface of the image. In general, the pigment ink is difficult to permeate into a print medium, and likely to remain on its surface because of its high surface tension, and therefore tends to fix on the surface of the print medium convexly. As a result, when rubbing the surface, a color material is peeled off or moved by friction force, and thereby an image is damaged.

In order to solve such a problem on rub resistance, for example, Japanese Patent Laid-Open Nos. 2005-225948, 2004-131586, and 2006-335858 disclose pigment ink of which rub resistance is improved by making dispersion liquid contain polyurethane resin.

However, even in the case of using ink as disclosed in the above patent literatures, sometimes, sufficient rub resistance cannot be obtained depending on a print state on a print medium.

FIGS. 13A and 13B are diagrams illustrating pigment ink landing states on print media, respectively, each illustrating a cross-sectional view at the time when one or two ink droplets travel toward the print medium, and then land on and permeate into the print medium to form one or two dots. Here, FIG. 13A illustrates a state where one dot lands by itself, and FIG. 13B illustrates a state where two dots land adjacently. In either case of the single dot or the adjacent dots, moisture and a solvent in the ink permeate into the print medium, but a pigment component remains on the surface of the print medium. However, in the case of the single dot, a pigment layer having uniform thickness is formed on the print medium, whereas in the case of the adjacent dots, the thickness of a pigment layer increases in a part where the respective dots overlap each other, and a local convex part is formed. As a result, a state where multiple dots are printed as in FIG. 13B is weak in rub resistance as compared with a state where a single dot is printed as in FIG. 13A.

Meanwhile, the degree of rub resistance varies depending on an ink type. In general, ink having higher surface tension is weaker in permeation force into a print medium, and the rub resistance thereof in an overlapping area as described above is weaker. On the other hand, in the case of ink having relatively low surface tension, rub resistance is unlikely to become problematic. That is, regardless of whether ink to be used is pigment ink or dye ink, the surface tension of the ink is different depending on the type of a color material or a solvent, and the degree of rub resistance is also different.

Also, in the case of using two inks between which the difference in surface tension is large, the permeability of the ink having high surface tension into a print medium can be increased by applying the ink having low surface tension. That is, by printing the ink having high surface tension immediately after or almost simultaneously with printing of the ink having low surface tension, the permeation of the ink having high surface tension can also be facilitated to increase rub resistance.

FIGS. 14A to 14C are diagrams for explaining the effect of such a printing method. FIG. 14A is a landing diagram when an ink droplet of dye ink having low surface tension is applied to a print medium. The dye ink having low surface tension permeates deeply through the print medium, and never remains on the surface of the print medium. FIG. 14B is a landing diagram when immediately after dye ink has landed, pigment ink having high surface tension is applied to the same position. In an area where the dye ink permeates, the fiber of a print medium swells, and the pigment ink containing large particles also easily permeates and is unlikely to remain on the surface. FIG. 14C is a landing diagram when pigment ink and dye inks on both adjacent sides of the pigment ink are simultaneously applied. The pigment ink also becomes likely to permeate through a print medium in association with the dye inks, and as in FIG. 14B, the pigment ink is unlikely to remain on the surface of the print medium. As long as printing is performed in a state like that in FIG. 14B or 14C, unevenness on the surface of a print medium is suppressed, and the rub resistance of an image can be enhanced.

However, the original advantage of pigment ink is to realize a high-density image because pigment remains on the surface of a print medium. Accordingly, preventing pigment from remaining on the surface of a print medium as described above may result in a loss of desired image density.

SUMMARY OF THE INVENTION

The present invention is made in order to solve the above-described problem, and an object thereof is to provide an image processing apparatus and image processing method that in an inkjet printing system adapted to print an image using multiple inks having different surface tensions, can improve the rub resistance of an entire image and stably output the image at high density.

According to a first aspect of the present invention, there is provided an image processing apparatus for printing an image on a print medium by using a printing unit that ejects a first ink in accordance with first quantized data and ejects a second ink in accordance with second quantized data, the image printing apparatus comprising: a first quantization which quantizes multi-valued data corresponding to the first ink to generate the first quantized data, the multi-valued data indicating intermediate density; and a second quantization unit which quantizes multi-valued data corresponding to the second ink to generate the second quantized data, the multi-valued data indicating intermediate density, wherein: surface tension of the first ink is larger than surface tension of the second ink, and a first dot pattern printed on the print medium in accordance with the first quantized data has higher dispersibility than a second dot pattern printed on the print medium in accordance with the second quantized data.

According to a second aspect of the present invention, there is provided an image processing method for printing an image on a print medium by ejecting a first ink in accordance with first quantized data and ejecting a second ink in accordance with second quantized data, the image processing method comprising: a first quantization step of quantizing multi-valued data corresponding to the first ink to generate the first quantized data, the multi-valued data indicating intermediate density; and a second quantization step of quantizing multi-valued data corresponding to the second ink to generate the second quantized data, the multi-valued data indicating intermediate density, wherein: surface tension of the first ink is larger than surface tension of the second ink, and a first dot pattern printed on the print medium in accordance with the first quantized data has higher dispersibility than a second dot pattern printed on the print medium in accordance with the second quantized data.

According to a third aspect of the present invention, there is provided a storage medium adapted to store a program for instructing a computer to function as respective units of an image processing apparatus for printing an image on a print medium by using a printing unit that ejects a first ink in accordance with first quantized data and ejects a second ink in accordance with second quantized data, the image processing apparatus comprising: a first quantization unit which quantizes multi-valued data corresponding to the first ink to generate the first quantized data, the multi-valued data indicating intermediate density; and a second quantization unit which quantizes multi-valued data corresponding to the second ink to generate the second quantized data, the multi-valued data indicating intermediate density, wherein: surface tension of the first ink is larger than surface tension of the second ink; and a first dot pattern printed on the print medium in accordance with the first quantized data has higher dispersibility than a second dot pattern printed on the print medium in accordance with the second quantized data.

Further features of the present invention will become apparent from the following description of exemplary embodiments (with reference to the attached drawings).

BRIEF DESCRIPTION OF THE DRAWINGS

FIGS. 11A to 11C are diagrams for explaining a dither process;

DESCRIPTION OF THE EMBODIMENTS

First Embodiment

Figure 1:
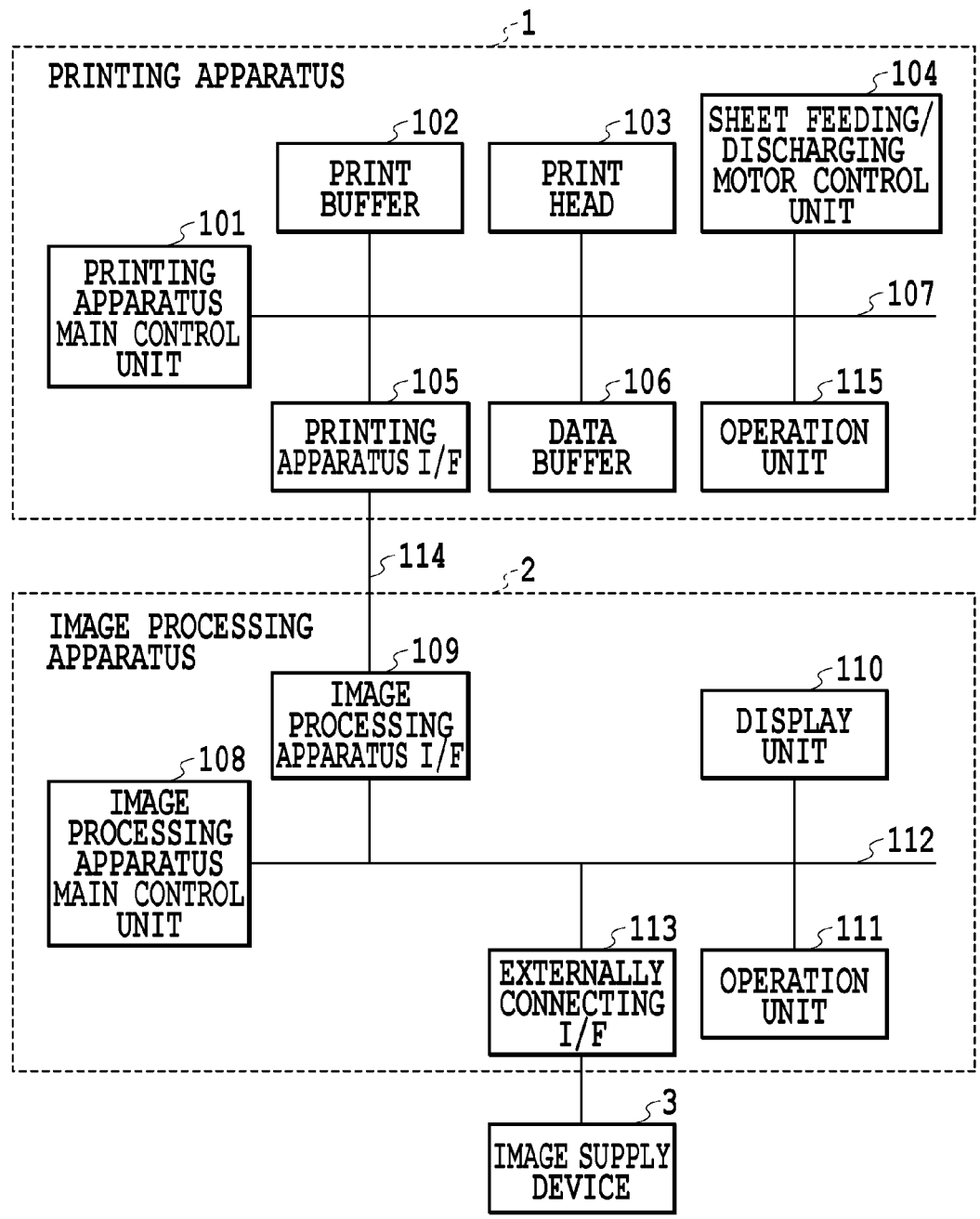
FIG. 1 is a block diagram illustrating the control configuration of an inkjet printing system.

FIG. 1 is a block diagram illustrating the control configuration of an inkjet printing system applicable to the present invention. The inkjet printing system in the present embodiment is configured to include a personal computer 2 (PC) serving as an image processing apparatus and an inkjet printing apparatus 1 (hereinafter also simply referred to as a printing apparatus). Image data having been subjected to a predetermined image process in the image processing apparatus 2 is sent to the printing apparatus 1, and printed by a print head 103.

In the printing apparatus 1, a printing apparatus main control unit 101 is one for controlling the whole of the printing apparatus 1, and configured to include a CPU, ROM, RAM, and the like. A print buffer 102 can store image data before transfer to the print head 103 as raster data. The print head 103 is an inkjet type print head having multiple ejection ports capable of ejecting inks as droplets, and in accordance with image data stored in the print buffer 102, ejects inks from respective ejection ports. In the present embodiment, it is assumed that ejection port arrays for four colors of cyan, magenta, yellow, and black are arrayed on the print head 103.

A sheet feeding/discharging motor control unit 104 controls conveyance of print media and sheet feeding/discharging. A printing apparatus interface (I/F) 105 communicates a data signal with the image processing apparatus 2. An I/F signal line 114 connects the both. As the I/F signal line 114, one specified by, for example, Centronics Data Computer Corporation can be applied. A data buffer 106 temporarily stores image data received from the image processing apparatus 2. A system bus 107 connects the respective functions of the printing apparatus 1. An operation unit 115 includes an LCD adapted to display various pieces of information to a user, and buttons for the user to perform a command operation.

Figure 6:
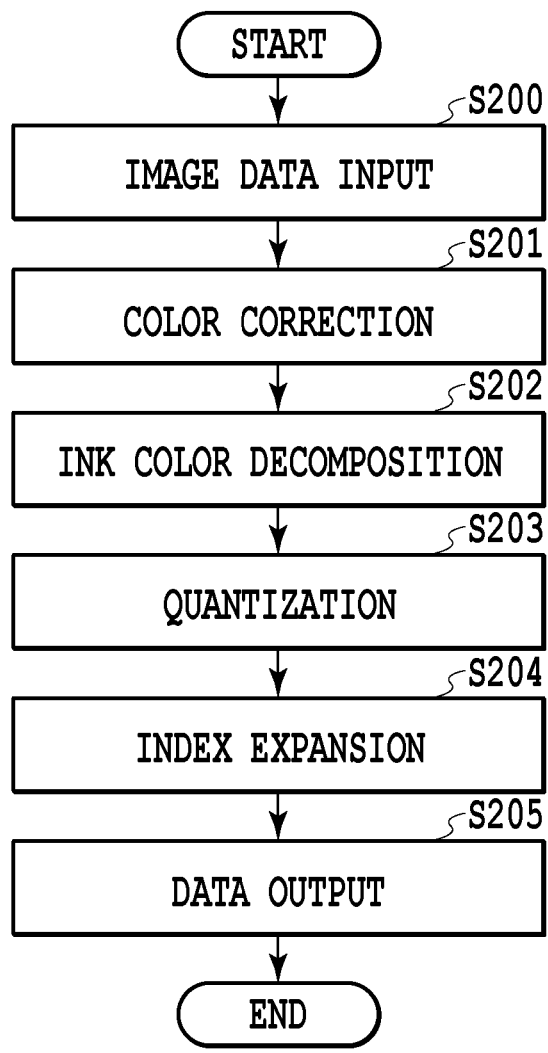
FIG. 6 is a flowchart for explaining an image data process.
Figure 7:
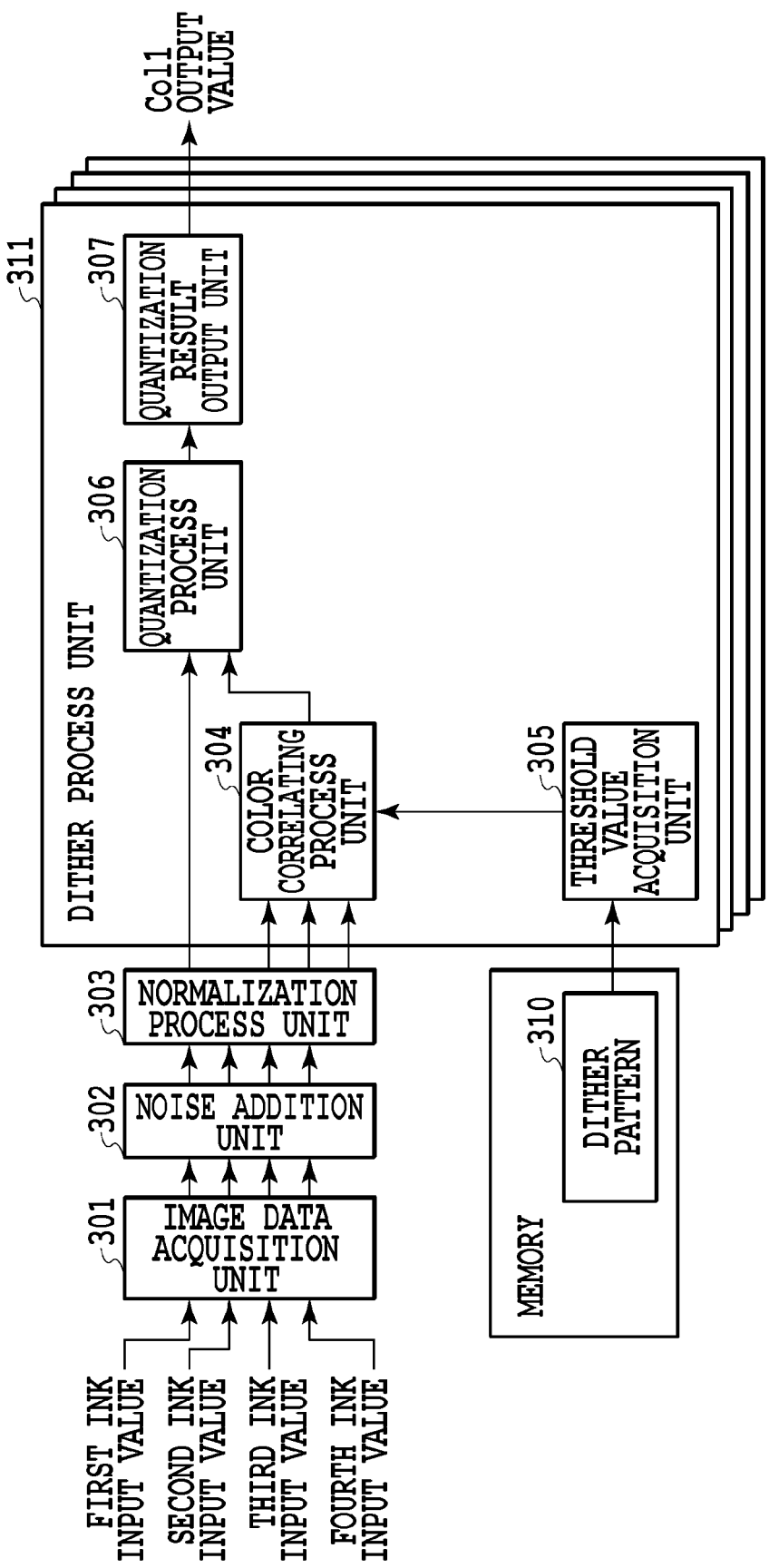
FIG. 7 is a block diagram for explaining the detail of a quantization process.
Figure 8A:
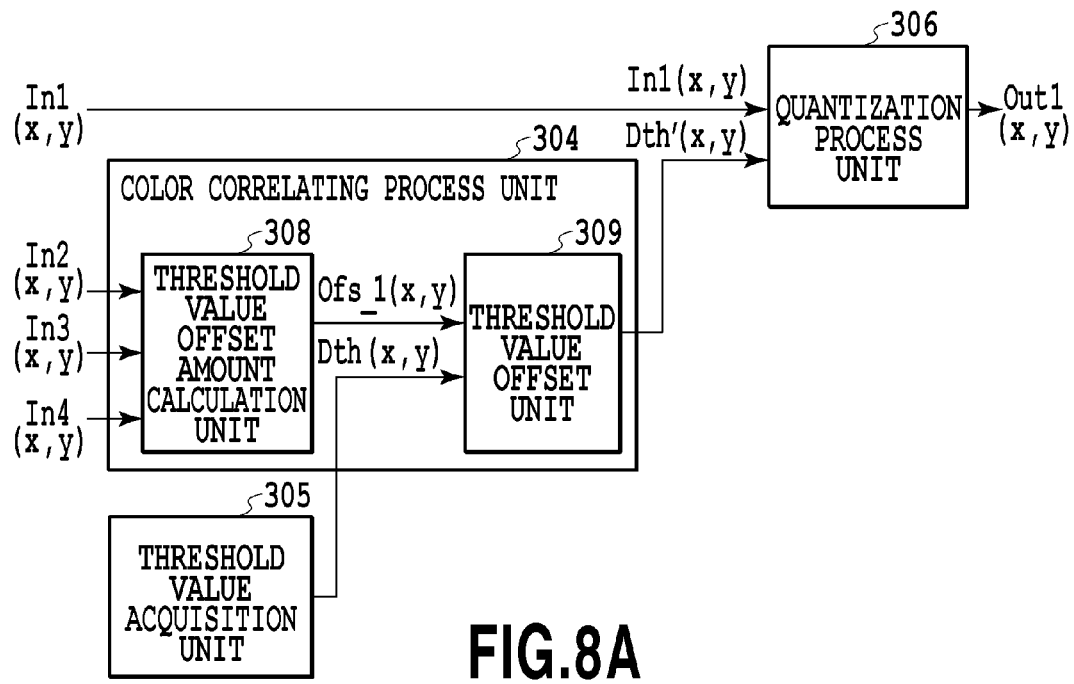
FIGS. 8A and 8B are diagrams for explaining a color correlating process unit.
Figure 8B:
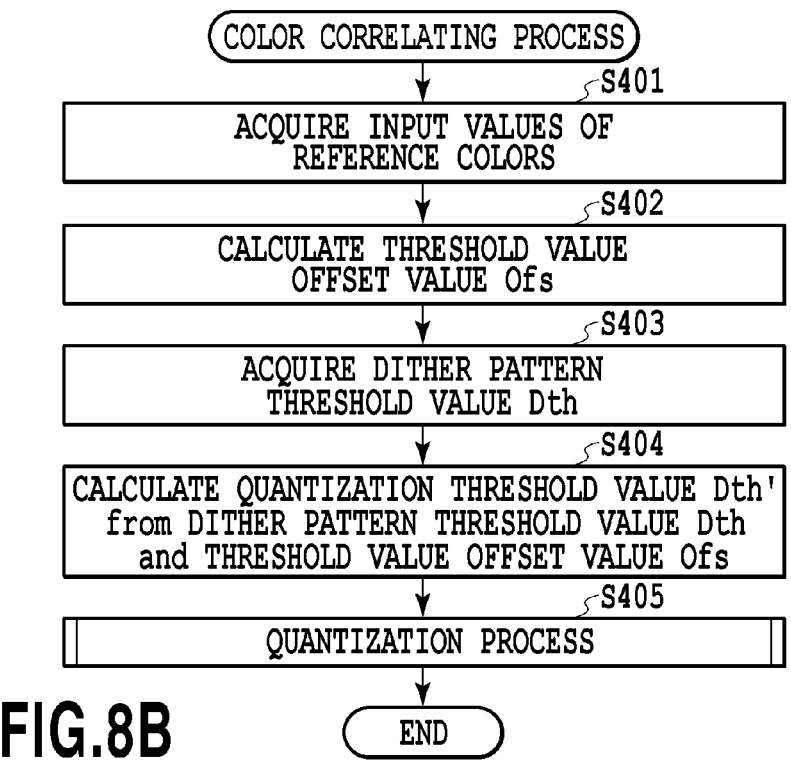

In the image processing apparatus 2, an image processing apparatus main control unit 108 is one for performing various processes on an image supplied from an image supply device 3, and thereby generating image data printable by the printing apparatus 1, and includes a CPU, ROM, RAM, and the like. The below-described configuration illustrated in FIGS. 7 and 8A is also provided in the image processing apparatus main control unit 108, and flowcharts to be described with FIGS. 6 and 8B are performed by the CPU of the image processing apparatus main control unit 108. An image processing apparatus interface (I/F) 109 communicates a data signal with the printing apparatus 1. An externally connecting interface (I/F) 113 communicates image data and the like with the image supply device 3 externally connected. A display unit 110 displays various pieces of information to a user, and can be applied with a display such as an LCD. An operation unit 111 is a mechanism for a user to perform a command operation, and can be applied with, for example, a keyboard and a mouse. A system bus 112 connects the image processing apparatus main control unit 108 and the respective functions to each other.

Figure 2:
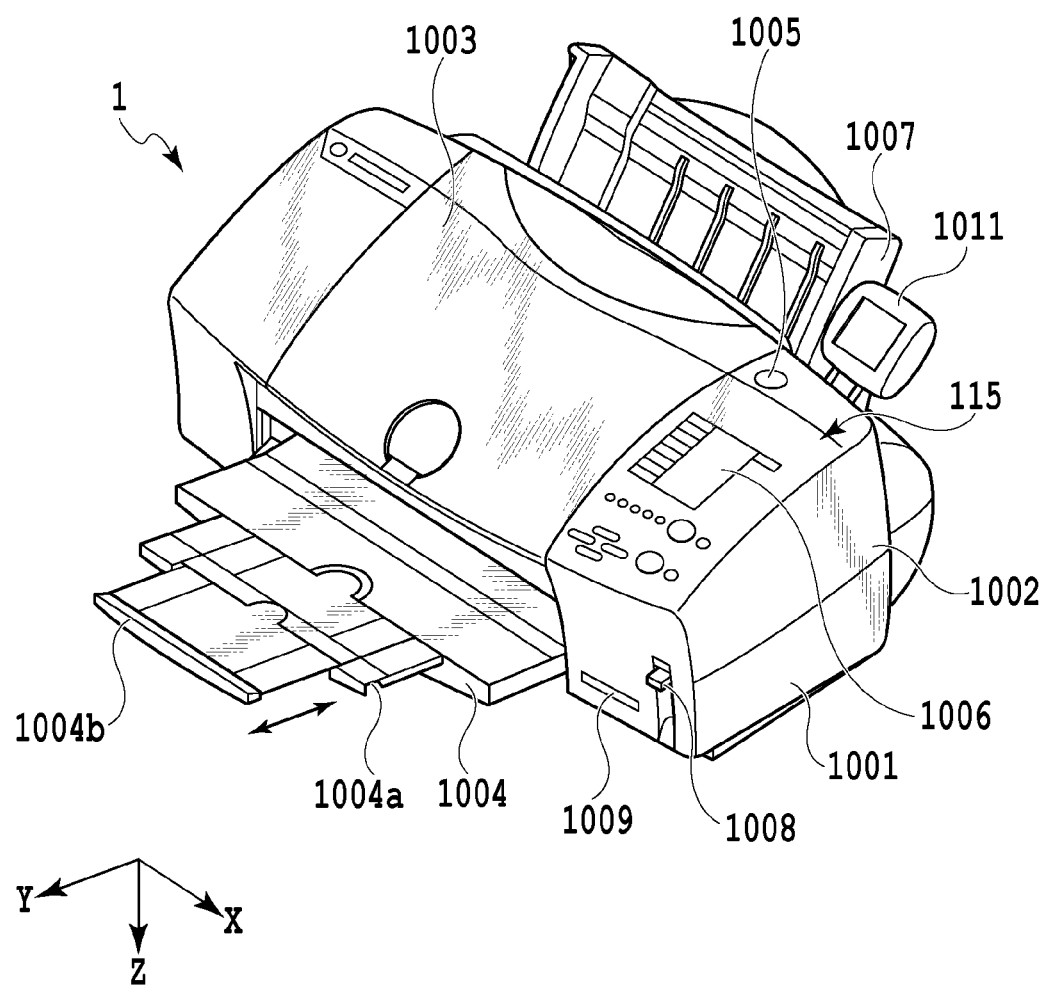
FIG. 2 is a schematic perspective view of a printing apparatus.

FIG. 2 is a schematic perspective view of the printing apparatus 1 used in the present embodiment. The printing apparatus 1 has: a function as an ordinary PC printer adapted to receive data from the image processing apparatus 2 and print the data; and a function that prints image data recorded in a storage medium such as a memory card and image data received from a digital camera.

A main body as the outer shell of the printing apparatus 1 has exterior members including a lower case 1001, upper case 1002, access cover 1003, paper feed tray 1007, and paper discharge tray 1004. The lower case 1001 and the upper case 1002 respectively form substantially lower and upper half portions of the apparatus 1, and combining the both cases forms a containing space for containing respective mechanisms inside.

The paper feed tray 1007 is capable of stacking and holding multiple print media, and adapted to automatically feed the uppermost one print medium into the apparatus when a print command is inputted. On the other hand, the paper discharge tray 1004 is configured to be held at one end part thereof in a rotatably movable manner by the lower case 1001, and open/close an opening part formed in the front surface of the lower case 1001 along with the rotational movement. When performing a print action, by rotationally moving the paper discharge tray 1004 toward the front surface side to open the opening part, print sheets can be discharged from the opening part, and the discharged print sheets can be sequentially stacked. The paper discharge tray 1004 contains two auxiliary trays 1004a and 1004b, and is adapted to be able to enlarge or reduce a support area for print media at three steps by pulling the respective tray as needed.

In the space inside the apparatus, the print head 103 for printing an image on a print medium, a carriage adapted to be movable in an X direction in the diagram mounting the print head 103 and ink tanks, a conveyance mechanism that conveys a print medium in a Y direction stepwise by a predetermined amount, and the like are disposed.

Figure 3:
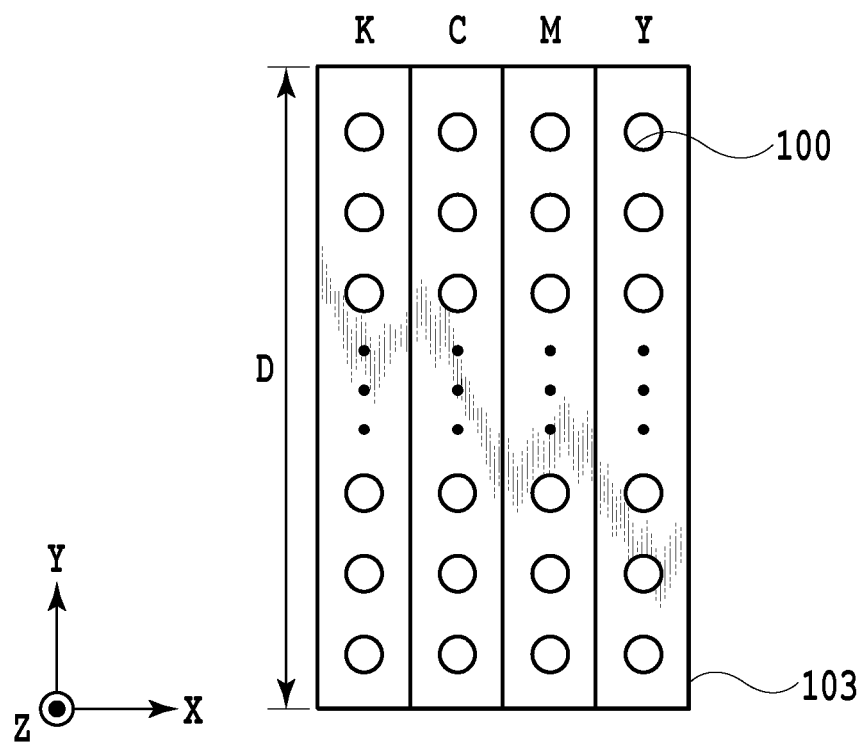
FIG. 3 is a schematic diagram of a print head as seen from an ejection port surface side.

FIG. 3 is a schematic diagram of the print head 103 used in the present embodiment as seen from an ejection port surface side. The print head 103 in the present embodiment is configured to, in the X direction, parallel arrange ejection port arrays each of which in the Y direction at predetermined pitches, arrays multiple ejection ports 100 adapted to eject each of cyan (C), magenta (M), yellow (Y), and black (K) inks. The print head 103 ejects the inks from respective ejection ports 100 while moving in the X direction, and thereby the inks are applied to a print medium sequentially from yellow→magenta→cyan→black to print an image having a width D on the print medium.

Referring to FIG. 2 again, when the print command is inputted, a print medium having been conveyed from the paper feed tray 1007 into the apparatus is conveyed to a printable area by the print head 103. Then, after the print head 103 has performed one print scan, the conveyance mechanism conveys the print medium in the Y direction by a distance corresponding to the print width D. By repeating the print scan by the print head 103 and the conveyance action of the print medium as described, an image is formed on the print medium stepwise. The print medium on which printing is complete is discharged onto the paper discharge tray 1004.

The access cover 1003 is held at one end part in a rotatably movable manner by the upper case 1002, and adapted to open/close an opening part formed in the upper surface. By opening the access cover 1003, the print head 103, each of the ink tanks, or the like contained inside the main body can be replaced. Note that although not illustrated here, on the back surface of the access cover 1003, a projection for being detected by a micro switch placed on the main body when the access cover 1003 is closed is disposed. That is, an open/close state of the access cover 1003 can be detected on the basis of a result of the detection of the projection by the micro switch.

On the upper surface of the upper case 1002, a power key 1005 is depressibly provided. Also, on the upper surface of the upper case 1002, the operation panel 115 including a liquid crystal display part 1006, various key switches, and the like is provided.

A distance-to-paper selection lever 1008 is a lever for adjusting the interval between an ink ejection surface of the print head 103 and the surface of a print medium. A card slot 1009 is an opening part for containing an adapter attachable with a memory card. Image data stored in the memory card is sent to a control unit 3000 of the printing apparatus through the adapter inserted into the card slot 1009, then subjected to a predetermined process, and printed on a print medium. As the memory card (PC), for example, a compact flash memory, smart medium, memory stick, or the like can be cited. A viewer (liquid crystal display unit) 1011 displays an image such as a frame-based image or an index image in the case of, for example, searching for an image desired to be printed from among images stored in the memory card. In the present embodiment, the viewer 1011 is adapted to be attachable to and detachable from the printing apparatus 1 main body. A terminal 1012 is a terminal for connecting a digital camera, and a terminal 1013 is a USB bus connector for connecting a personal computer (PC).

Figure 4:
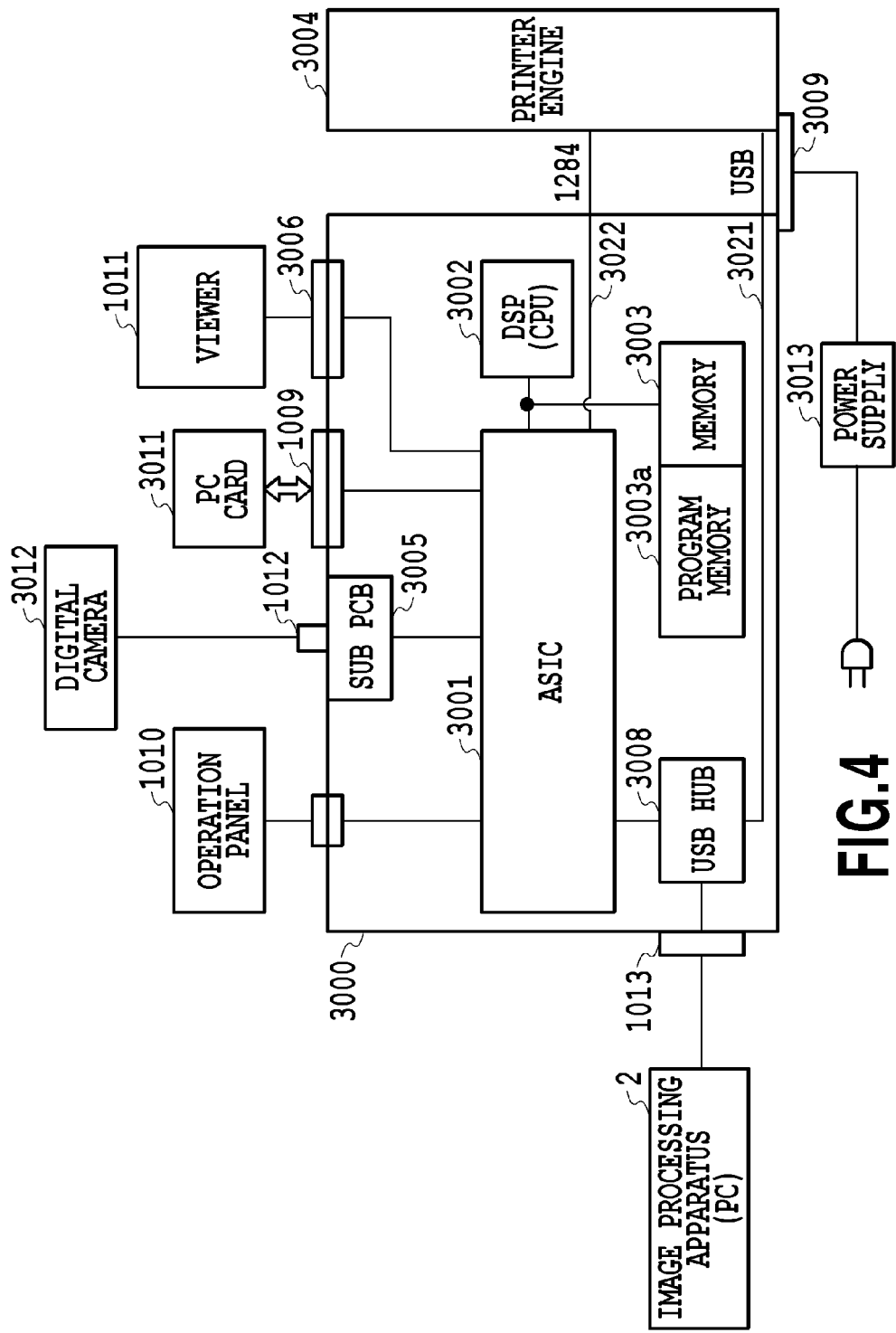
FIG. 4 is a block diagram for explaining the control configuration of the printing apparatus.

FIG. 4 is a block diagram for explaining the control configuration of the printing apparatus 1. In the control unit 3000 (control board), a DSP 3002 (digital signal processor) has a CPU inside to perform various image processes and control the whole of the printing apparatus. A memory 3003 has, in addition to a program memory 3003a that stores a program to be executed by the CPU of the DSP 3002, a RAM area for storing the program in execution, and a memory area functioning as a work memory that stores data such as image data. A printer engine 3004 includes a printer engine for printing a colored image using color inks of multiple colors.

A USB bus connector 3005 is a port for connecting the digital camera 3012. A connector 3006 connects the viewer 1011. A USB bus hub 3008 (USB HUB) is a line concentrator for USB transfer to the printer engine 3004. When image data having been subjected to the predetermined image process by the externally connected image processing apparatus 2 (PC) is received, the USB bus hub 3008 directly transmits the image data to the printer engine. In doing so, the PC 2 connected can directly communicate data or a signal with the printer engine 3004 (i.e., functions as a general PC printer)

A power connector 3009 inputs, into the apparatus, DC voltage to which commercial AC is converted by a power supply 3013. The signal communication between the control unit 3000 and the printer engine 3004 is performed through a USB bus 3021 or an IEEE 1284 bus 3022.

Figure 5:
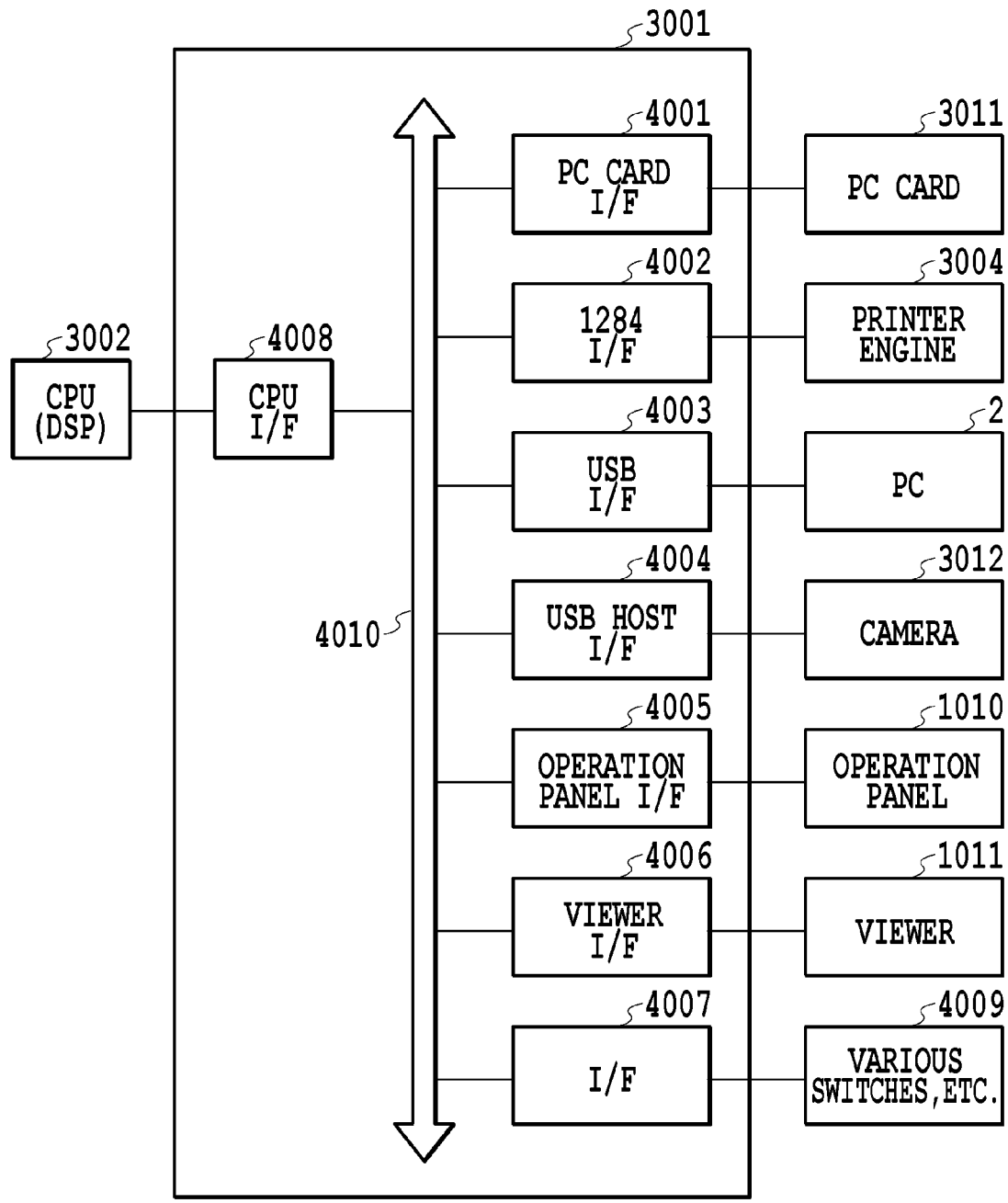
FIG. 5 is a block diagram illustrating the configuration of an ASIC.

FIG. 5 is a block diagram illustrating the configuration of an ASIC 3001. A PC card interface part 4001 reads image data stored in an attached PC card 3011 or write data to the PC card 3011. An IEEE 1284 interface part 4002 communicates data with the printer engine 3004. The IEEE 12 84 interface part is a bus that is used when image data stored in the digital camera 3012 or the PC card 3011 is printed. A USB interface part 4003 communicates data with the PC 2. A USB host interface part 4004 communicates data with the digital camera 3012. An operation panel interface part 4005 inputs various types of operation signals from an operation panel 1010 or outputs display data to the display part 1006. A viewer interface part 4006 controls the display of image data on the viewer 1011. An interface 4007 is an interface part adapted to control the communication with each of various switches and LEDs 4009. A CPU interface part 4008 controls the data communication with the DSP 3002. These respective parts are mutually connected through an internal bus (ASIC bus) 4010. A control program for them is configured in a multitasking form that assigns a task to each functional module.

FIG. 6 is a flowchart for explaining an image data process performed by the image processing apparatus main control unit 108 in the present embodiment. This process is performed by the CPU provided in the image processing apparatus main control unit 108 in accordance with a program stored in the ROM. In FIG. 6, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing standardized color space such as sRGB. In Step S201, these pieces of luminance data are converted to pieces of RGB 12-bit luminance data corresponding to color space specific to the printing apparatus. As a method for converting a signal value, a publicly known method such as a method that refers to a lookup table (LUT) preliminarily stored in the ROM can be employed.

In Step S202, the image processing apparatus main control unit 108 decomposes the converted pieces of RGB data to pieces of 16-bit gradation data (density data) respectively for C (cyan), M (magenta), Y (yellow), and K (black) that are the ink colors of the printing apparatus. In this step, a 16-bit gray image is generated for each of four channels (four colors). In the ink color decomposition process as well, a lookup table (LUT) preliminarily stored in the ROM or the like can be referred to as in the color correction process.

In Step S203, the image processing apparatus main control unit 108 performs a predetermined quantization process on the pieces of 16-bit gradation data respectively corresponding to the ink colors to convert to pieces of several bit quantized data. For example, in the case of quantization into 3-level data, the pieces of 16-bit gradation data are converted to pieces of 2-bit data each corresponding to any of Level 0 to Level 2. The quantization process will be described later in detail.

In subsequent Step S204, the image processing apparatus main control unit 108 performs an index expansion process. Specifically, from among multiple dot arrangement patterns where the number of dots to be printed in each pixel and a corresponding position are determined, one dot arrangement pattern is related to a level obtained in Step S203 to be selected. Then, resultant pieces of dot data are outputted as pieces of binary data (Step S205). This completes the image data process.

In a printing apparatus adapted to express image density on the basis of printing or non-printing of dot as in the inkjet printing apparatus in the present embodiment, it is necessary to quantize multi-valued density data to low level data usable by the printing apparatus. Conventionally, as such a quantization method, an error diffusion method and a dither method have been known. In particular, in the case of outputting a colored photograph image, dot dispersibility in a lower gradation range is focused on, and therefore a quantization process different for each ink color is performed to print dots of different colors at mutually different positions. Also, exclusively printing dots of different colors in this manner is effective also for preventing adjacently printed dots from forming unevenness as described with FIG. 13B. However, in this case, in a dot pattern printed on a print medium, the distinctive features of an employed quantization process appear to some extent. That is, in the case of performing quantization processes respectively for different ink colors, the distinctive features of a dot pattern are different among the colors.

The present inventors have reached the following knowledge in consideration of the situations as described above. That is, among multiple quantization processes employable by a printing apparatus, a quantization process resulting in a dot pattern having relatively high dispersibility is set for an ink having relatively high surface tension. On the other hand, a quantization process resulting in a dot pattern having relatively low dispersibility is set for an ink having relatively low surface tension.

In the following, a quantization process employed in the present embodiment, i.e., a quantization process performed in Step S203 of FIG. 6 will be described in detail.

FIG. 7 is a block diagram for explaining the detail of the quantization process in the present embodiment. The quantization process in the present invention is performed in accordance with the dither method. In the quantization process in the present embodiment, an input value is first processed, then a threshold value is processed, and finally the quantization process is performed. These series of processes are parallel performed on a color basis (on a channel basis). In the following, each of the processes will be described in detail with reference to FIG. 7.

An image data acquisition unit 301 acquires pieces of 16-bit gradation data indicating the density of each pixel. It is assumed that the image data acquisition unit 301 in the present embodiment can receive signals having at most 16 bits for eight colors. The diagram illustrates a state where the pieces of 16-bit data respectively on first to fourth inks are inputted.

A noise addition process unit 302 adds predetermined noise to the pieces of 16-bit gradation data. By adding the noise, even in the case where pieces of gradation data of the same level are continuously inputted, a state where the same patterns are continuously arranged can be avoided to reduce a stripe, texture, and the like. The noise addition process unit 302 multiplies a predetermined random table, fixed intensity, and variable intensity corresponding to an input value, and thereby noise is generated for each pixel and added to the input value. Note that the random table is a table adapted to set the polarity of noise, and sets a plus, zero, or a minus for each pixel position. The random table in the present embodiment can have at most eight faces, and the size of each table can be arbitrarily set. The fixed intensity indicates the intensity of a noise amount, and the magnitude of the intensity determines whether noise is large or small. In the present embodiment, by setting a random table or fixed intensity optimum for each print mode depending on the graininess of, the degrees of stripe and texture of an image, and the like, a noise amount can be appropriately adjusted.

A normalization process unit 303 relates a gradation value of each pixel represented by 16 bits to a level value enabling the index expansion in Step S204, and then normalizes each level range to 12 bits. In the following, a specific description will be given. In the case where the index expansion process in Step S204 is a process corresponding to n values from Level 0 to Level (n−1), the normalization process unit 303 equally divides 65535 gradations represented by 16 bits into (n−1). The normalization process unit 303 relates a gradation value 0 to Level 0, gradation values 1 to 65535 to Level 1 to Level (n−1), respectively. Further, a range corresponding to each level is normalized to 12 bits (4096 gradations). This makes it possible to, for each pixel, obtain pieces of 12-bit data related to any of Level 0 to Level (n−1).

For example, in the case where the index expansion process corresponds to three values of Level 0 to Level 2, the normalization process unit 303 equally divides the 65535 gradations represented by 16 bits into two. Then, the normalization process unit 303 relates a gradation value 0 to Level 0, gradation values 1 to 32767 to Level 1, and gradation values 32768 to 65535 to Level 2. Further, the normalization process unit 303 normalizes respective ranges (32767 gradation width) corresponding to Level 1 and Level 2 to 12 bits (4096 gradations). In doing so, pieces of 12-bit data related to any of Level 0 to Level 2 can be obtained for each pixel.

The processes in the image data acquisition unit 301 to the normalization process unit 303 described above are parallel performed on the pieces of gradation data on the respective colors. That is, in the present embodiment, the pieces of 12-bit data on black, cyan, magenta, and yellow are generated, and inputted to a dither process unit 311.

In the dither process unit 311, 12-bit data to be quantized (processing target data) is directly transmitted to a quantization process unit 306. On the other hand, pieces of 12-bit data on colors other than the processing target data are inputted to a color correlating process unit 304 as pieces of reference data. The color correlating process unit 304 performs a predetermined process on a threshold value acquired by a threshold value acquisition unit 305 on the basis of the pieces of reference data to determine a final threshold value, and transmits the final threshold value to the quantization process unit 306. The quantization process unit 306 compares the processing target data with the threshold value inputted from the color correlating process unit 304, and thereby determines printing (1) or non-printing (0) of dot.

The threshold value acquisition unit 305 acquires a threshold value corresponding to a pixel position associated with the processing target data from a dither pattern 310 stored in a memory such as the ROM. In the present embodiment, the dither pattern 310 is a threshold value matrix formed by arraying threshold values of 0 to 4095 so as to have blue noise characteristics, and can provide various sizes and shapes such as 512×512 pixels, 256×256 pixels, and 512×256 pixels. That is, the memory preliminarily stores multiple threshold value matrices having different sizes and shapes as described, and the threshold value acquisition unit 305 selects a threshold value matrix corresponding to a print mode from among the multiple threshold value matrices. Then, from among multiple threshold values arrayed in the selected threshold value matrix, the threshold value acquisition unit 305 provides a threshold value corresponding to the pixel position (x, y) associated with the processing target data to the color correlating process unit. In the following, a method for determining a threshold value in the color correlating process unit 304 will be described in detail. The distinctive features of a threshold value matrix having blue noise characteristics will be described later in detail.

FIGS. 8A and 8B are a block diagram and a flowchart, respectively, for explaining the configuration and steps of a process in the color correlating process unit 304. The color correlating process unit 304 sets the pieces of 12-bit data corresponding to the colors other than the processing target data as the pieces of reference data, uses these pieces of reference data to perform the predetermined process on the threshold value acquired by the threshold value acquisition unit 305, and calculates the threshold value for quantizing the processing target data. For example, in the case where the processing target data is 12-bit data on black, the pieces of reference data are pieces of 12-bit data on cyan, magenta, and yellow. In FIGS. 7 and 8, the processing target data is denoted by $In1(x, y)$, and the pieces of reference data are denoted by $In2(x, y)$, $In3(x, y)$, and $In4(x, y)$. Here, (x, y) represents the pixel position, which serves as a coordinate parameter for the threshold value acquisition unit 305 to select the threshold value corresponding to the pixel position associated with the processing target data from the threshold value matrix.

Referring to FIG. 8A, the pieces of reference data $In2(x, y)$ to $In4(x, y)$ inputted to the color correlating process unit 304 are first inputted to a threshold value offset amount calculation unit 308 (Step S401). In doing so, the threshold value offset amount calculation unit 308 uses these pieces of reference data to calculate a threshold value offset Ofs_1(x, y) for the processing target data In1(x, y) (Step S402). In the present embodiment, the threshold value offset value Ofs_1 (x, y) is calculated in accordance with Expression 2.

$$Ofs\_1(x,y)=\Sigma i[Ini(x,y)] \quad \text{(Expression 2)}$$

Here, i represents a parameter for individually indicating, among the pieces of reference data $In2(x, y)$ to $In1(x, y)$, one or more pieces of reference data (hereinafter referred to as pieces of actual reference data) used to obtain the threshold value for the processing target data In1. The number and type of such pieces of actual reference data are predesignated for each processing target data.

In the present embodiment, it is assumed that in the case where the processing target data is $In1(x, y)$, a null is the actual reference data, and in the case where the processing target data is $In2(x, y)$, $In1(x, y)$ is the actual reference data. It is also assumed that in the case where the processing target data is $In3(x, y)$, $In1(x, y)$ and $In2(x, y)$ are the pieces of actual reference data, and in the case where the processing target data is $In1(x, y)$, $In1(x, y)$, $In2(x, y)$, and $In3(x, y)$ are the pieces of actual reference data. Accordingly, offsets Ofs_1(x, y) to Ofs_4(x, y) for the respective pieces of processing target data $In1(x, y)$ to $In4(x, y)$ can be expressed as follows in accordance with Expression 2.

$$Ofs\_1(x, y) = \sum i[In(x, y)] \quad \text{(Expression 2-1)}$$
$$= 0$$

$$Ofs\_2(x, y) = \sum i[In(x, y)] \quad \text{(Expression 2-2)}$$
$$= In1(x, y)$$

$$Ofs\_3(x, y) = \sum i[In(x, y)] \quad \text{(Expression 2-3)}$$
$$= In1(x, y) + In2(x, y)$$

$$Ofs\_4(x, y) = \sum i[In(x, y)] \quad \text{(Expression 2-4)}$$
$$= In1(x, y) + In2(x, y) + In3(x, y)$$

As described, when the threshold value offset values Ofs_1(x, y) to Ofs_4(x, y) are calculated, these values are inputted to a threshold value offset unit 309. On the other hand, the threshold value offset unit 309 acquires a threshold value Dth corresponding to the coordinates (x, y) associated with processing target data In(x, y) from the threshold value acquisition part 305 (Step S403).

In Step S404, as described below a difference between the threshold value Dth(x, y) and the processing target data is offset by the threshold value offset unit 309. The threshold value offset unit 309 subtracts the threshold value offset value Ofs_1($x, y$) inputted from the threshold value offset amount calculation unit 308 from the threshold value Dth(x, y) inputted from the threshold value acquisition unit 305 to obtain a quantization threshold value Dth'(x, y).

$$Dth'(x,y) = Dth(x,y) - Ofs\_1(x,y) \quad \text{(Expression 3)}$$

In so doing, in the case where Dth'(x, y) takes a minus value, the maximum threshold value Dth_max (in the present embodiment, 4096) is added, and a resultant value is treated as the quantization threshold value Dth'(x, y). That is, in the case where Dth'(x, y)<0, the following expression holds:

$$Dth'(x,y) = Dth'(x,y) + Dth\_max \quad \text{(Expression 4)}$$

As described above the quantization process unit 306 compares the processing target data and the quantization threshold value with each other in a state a difference between the threshold value Dth(x, y) and the processing target data have been offset by the threshold value offset unit.

When the quantization threshold value Dth'(x, y) is obtained in accordance with Expression 3 or 4, the quantization process unit 306 compares the processing target data In1($x, y$) with the quantization threshold value Dth'(x, y) to determine printing (1) or non-printing (0) for the pixel position (x, y). Then, in accordance with a level value related in the normalization process unit 303, in the case of printing (1) or non-printing (0), the corresponding level value or zero is outputted as quantized data Out1($x, y$) represented by several bits (Step S405). Specifically, in the case of In1($x, y$)>Dth'(x, y), the Out1($x, y$) is the level value related in the normalization process unit 303. On the other hand, in the case of In1($x, y$) Dth'(x, y), the Out1($x, y$) is zero. This completes the processing steps.

After that, as described with the flowchart in FIG. 6, the quantized data Out1($x, y$) represented by several bits is subjected to the index expansion process, and a dot pattern to be printed at the pixel position (x, y) is determined. In so doing, the number of dots to be printed at the pixel position (x, y) is set to be a number corresponding to the level value, such as one dot when the level value is 1, or two dots when the level value is 2.

Figure 9:
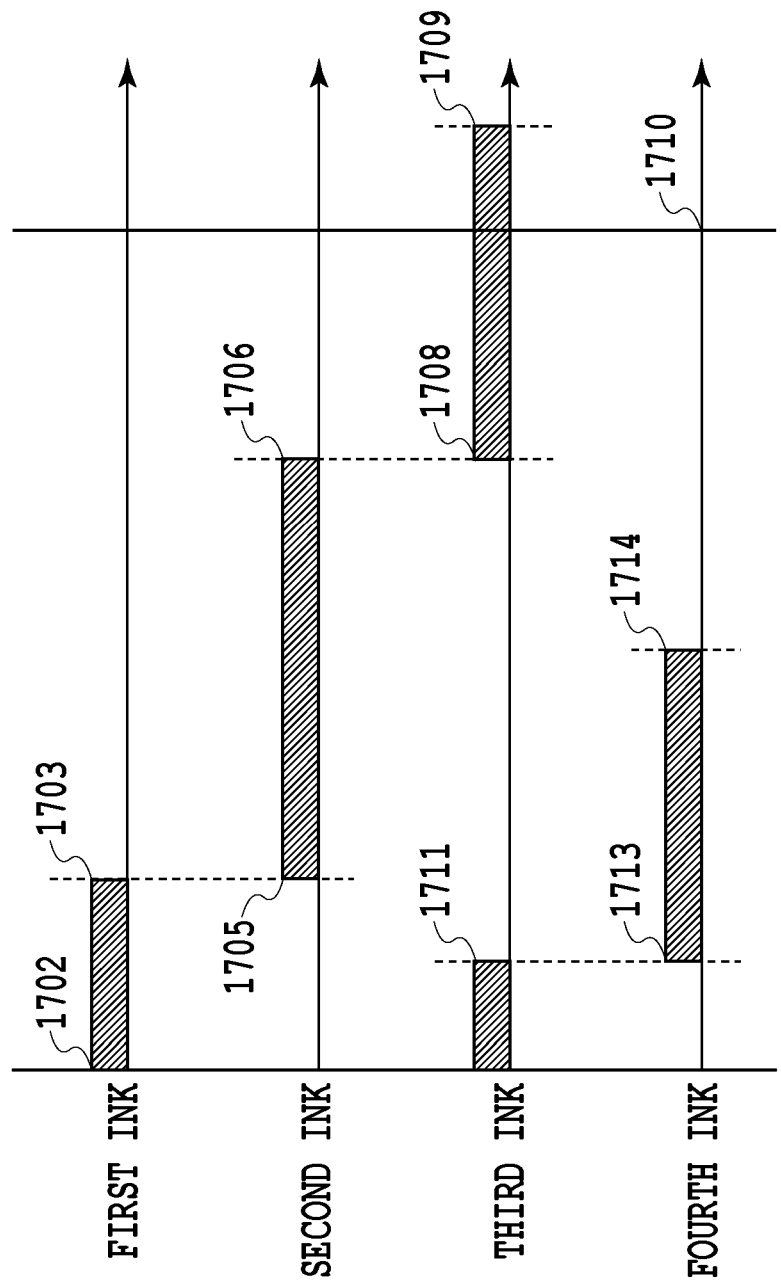
FIG. 9 is a diagram illustrating ranges of threshold values determined as printing on an ink color basis.

FIG. 9 is a diagram illustrating ranges of threshold values determined as printing (1) among the multiple threshold values 0 to Dth_max arranged in the dither pattern 310 when the first to fourth pieces of multi-valued data (In1 to In4) indicating intermediate density are inputted for the first to fourth inks, respectively. In the present embodiment, the offset of the first ink is Ofs_1=0 from Expression 2-1. Accordingly, pixel positions each corresponding to any of threshold values of 0 to In1(1702 to 1703) among 0 to Dth_max are set to printing (1).

The offset of the second ink is Ofs_2=In1 from Expression 2-2. Accordingly, as a result of quantization using the threshold value Dth' obtained in accordance with Expressions 3 and 4, threshold values of In1 to In1+In2 (1705 to 1706) among the threshold values 0 to Dth_max arrayed in the dither pattern 310 are set to printing (1).

The offset of the third ink is Ofs_3=In1+In2 from Expression 2-3. Accordingly, as a result of quantization using the threshold value Dth' obtained in accordance with Expressions 3 and 4, In1+In2 to In1+In2+In3 (1708 to 1709) among the threshold values 0 to Dth_max arrayed in the dither pattern 310 are set to printing (1). Note that in this example, (In1+In2+In3) is assumed to exceed Dth_max. In this case, an area exceeding Dth_max is treated as follows. That is, an area corresponding to the remainder obtained by dividing (In1+In2+In3) by Dth_max, i.e., threshold values of 0 to In1+In2+In3−Dth_max are set to printing (1). In other words, In1+In2 to Dth_max (1708 to 1710) and 0 to In1+In2+In3−Dth_max (1707 to 1711) are threshold value ranges determined as printing (1).

The offset of the fourth ink is Ofs_4=In1+In2+In3 from Expression 2-4. Accordingly, as a result of quantization using the threshold value Dth' obtained in accordance with Expressions 3 and 4, In1+In2+In3 to In1+In2+In3+In4 among the threshold values 0 to Dth_max arrayed in the dither pattern 310 are threshold values set to printing (1). Note that in this example, the entire area of In1+In2+In3 to In1+In2+In3+In4 exceeds Dth_max. Therefore, an area corresponding to the remainder obtained by dividing (In1+In2+In3+In4) by Dth_max, i.e., threshold values of In1+In2+In3−Dth_max to In1+In2+In3+In4−Dth_max (1713 to 1714) are set to printing (1).

As described, in the present embodiment, despite using the common threshold value Dth, the quantization threshold values Dth' specific to the respective colors are obtained by adding the mutually different offset values to the threshold value Dth. Further, by using the newly obtained quantization threshold values Dth' for the quantization process, positions to be printed with dots on a sheet can be made different on a color basis and preferably dispersed even in the case where pieces of comparable gradation data indicating intermediate density are inputted for the respective colors.

Next, the distinctive features of a threshold value matrix used by the present embodiment will be described. The threshold value matrix employed in the present embodiment is assumed to have blue noise characteristics. First, the blue noise characteristics will now be described.

Figure 10A:
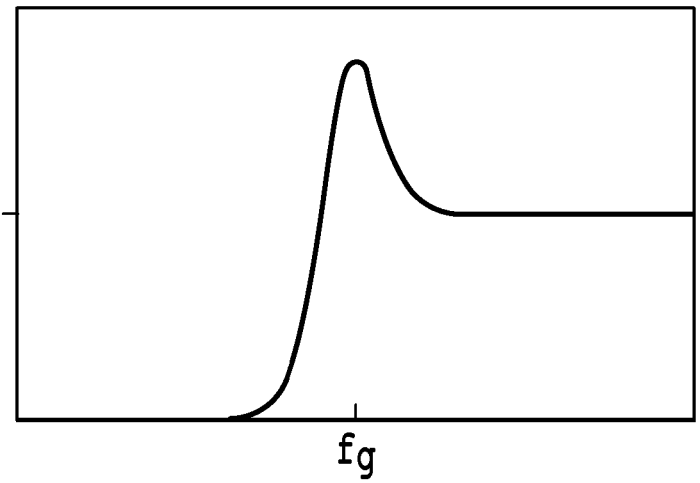
FIGS. 10A and 10B are diagrams illustrating the distinctive features of blue noise.
Figure 10B:
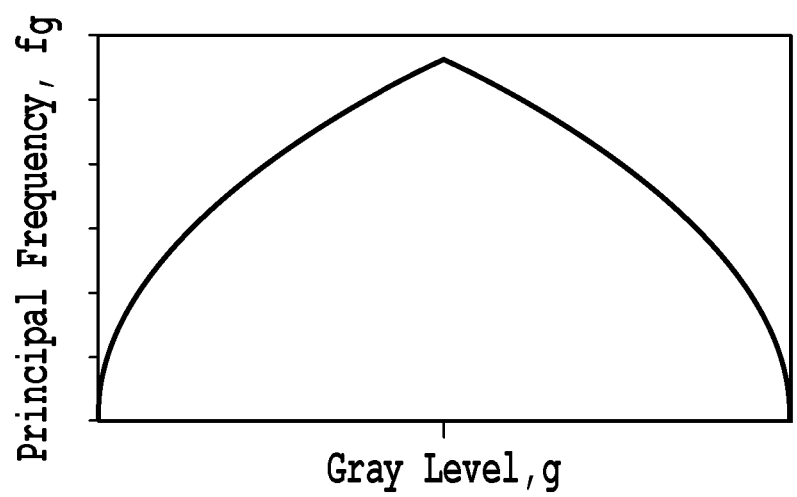

FIGS. 10A and 10B are diagrams illustrating the distinctive features of blue noise. In FIG. 10A, the horizontal axis represents a frequency (cycles/mm), indicating lower and higher frequencies toward the left and right of the graph, respectively. On the other hand, the vertical axis represents intensity (power) corresponding to each frequency. As can be seen also from FIG. 10A, the blue noise characteristics are characterized by, for example, a suppressed low frequency component, a rapid rise, and a flat high frequency component. Hereinafter, a frequency fg corresponding to a peak resulting from the rapid rise is referred to as a principal frequency. On the other hand, human visual characteristics have a peak in a lower frequency range, and sensitivity in a higher frequency range is low. That is, the low frequency component is conspicuous, whereas the high frequency component is inconspicuous. The blue noise characteristics are based on such visual characteristics, and adapted to, in the visual characteristics, hardly have power in the highly sensitive (conspicuous) lower frequency range, but have power in the low sensitive (inconspicuous) higher frequency range. For this reason, when a person visually observes an image having blue noise characteristics, dot deviation or periodicity is unlikely to be perceived, and the image is recognized as a comfortable image.

Meanwhile, in the blue noise characteristics described with FIG. 10A, the principal frequency fg is an average frequency when dispersing a predetermined number of dots as uniformly as possible; however, the principal frequency fg and peak intensity depend on a degree of dot concentration, i.e., gradation.

In FIG. 10B, the horizontal axis represents a gray level g (i.e., the degree of dot concentration), and the vertical axis represents the principal frequency fg at each gray level. The gray level g is given on the assumption that a state where dots are placed in all pixels in an image area corresponds to "1", a state where no dots are placed in all the pixels to "0", and a state where dots are placed in half of the pixels to "½". The principal frequency fg in this case can be expressed by Expression 1.

$$fg = \sqrt{g}|u| \; g \leq \frac{1}{2}$$

$$\sqrt{(1-g)}|u| \; g > \frac{1}{2} \quad \text{(Expression 1)}$$

In Expression 1, u represents the reciprocal of a pixel spacing. As can be seen from FIG. 10B and Expression 1, the principal frequency fg takes the maximum value of fg=√(½)|u| at a gray level of g=½, i.e., when dots are arranged in 50% of the pixels in the entire pixel area. In addition, as the gray level g separates from ½, the principal frequency fg also gradually shifts toward the lower frequency side.

In the case of preparing a threshold value matrix so as to exhibit the above-described blue noise characteristics while controlling frequency components, a void-and-cluster method can be employed. The detail of the void-and-cluster method is disclosed in Robert Ulichney, "The void-and-cluster method for dither array generation", Proceedings SPIE, Human Vision, Visual Processing, Digital Displays IV, vol. 1913, pp. 332-343, 1993.

In the case of preparing a threshold value matrix using the void-and-cluster method, a dot pattern in arbitrary gradation is first determined for a pixel area corresponding to the threshold value matrix. Then, a degree of dot concentration at each pixel position is calculated. As a parameter for the degree of dot concentration, an intensity sum of filter output, which increases as the degree of dot concentration increases, and decreases as the degree of dot concentration decreases, can be used. Subsequently, for the next gradation that is one level larger than the arbitrary gradation, a position where calculated degree of dot concentration is the lowest is searched for, and a threshold value for the next gradation is set for the position. By repeating such a threshold value setting step until all threshold values are set, a desired threshold value matrix is generated.

Figure 11B:
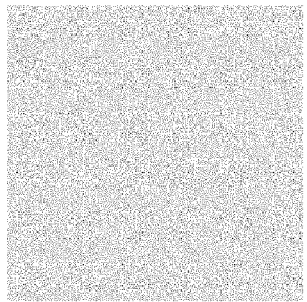
Figure 11C:
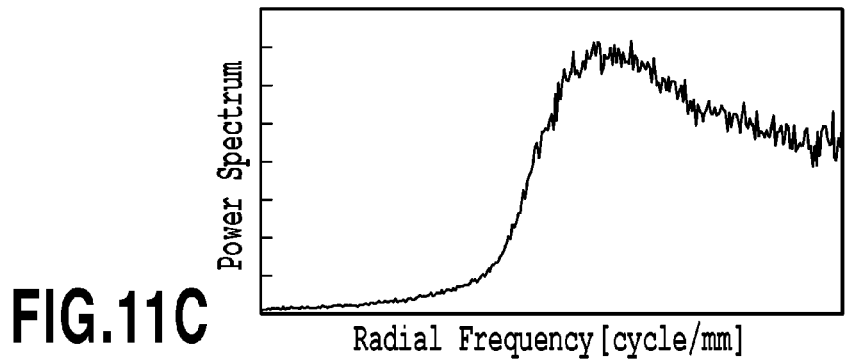

FIGS. 11A to 11C are diagrams for explaining a dither process using a threshold value matrix adapted to achieve blue noise characteristics. FIG. 11A illustrates the threshold value matrix that corresponds to a 512-pixel x 512-pixel area used in the present embodiment and is adapted to achieve the blue noise characteristics. Each pixel is related to any of threshold values of 0 to 4095. In the dither method, in the case where the gradation value In1 (~In4) indicated by the multi-valued image data is larger than the threshold value Dth', a corresponding pixel is designated as dot printing "1". On the other hand, in the case where the gradation value indicated by the multi-valued image data is equal to or less than the threshold value, the pixel is designated as dot non-printing "0". FIG. 11B illustrates a quantization result based on the dither method when pieces of image data having the same value are inputted into all the pixels. Pixels representing printing are indicated in black, and pixels representing non-printing "0" are indicated in white. Dot deviation or periodicity is unlikely to be perceived, and a dot pattern is recognized as a smooth image. FIG. 11C is a diagram illustrating the frequency distribution of the dot pattern illustrated in FIG. 11B. The dot pattern has the distinctive features of the blue noise characteristics illustrated in FIG. 10A, such as a suppressed lower frequency component, a rapid rise, and a flat higher frequency component.

As described above, in the present embodiment, while using the threshold value matrix resulting in the blue noise characteristics as described with FIGS. 11A to 11C, the quantization process is performed with an offset different for each of the colors being applied as illustrated in FIG. 9. For this reason, in particular, in a lower gradation range, dots of different colors are never printed overlapping each other, and the mixed color image having high dispersibility can be obtained.

Meanwhile, when actually comparing the results of printing the first to fourth inks in FIG. 9 with one another, the difference in dispersibility can be recognized among these inks. In the following, such a difference in dispersibility will be described in detail.

Figure 12A:
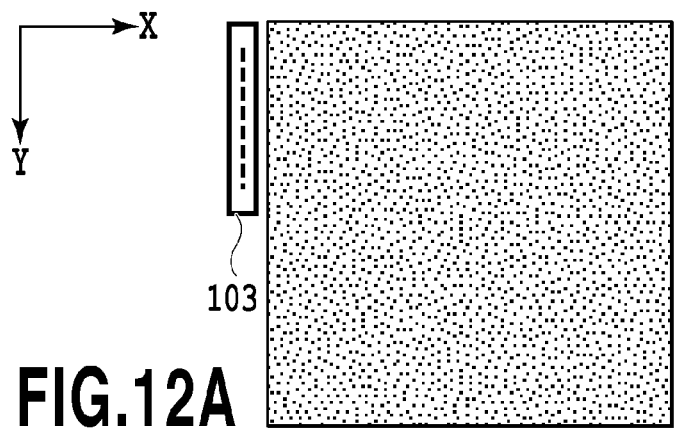
FIGS. 12A to 12C are diagrams respectively illustrating dot patterns and the frequency characteristics of the dot patterns.
Figure 12B:
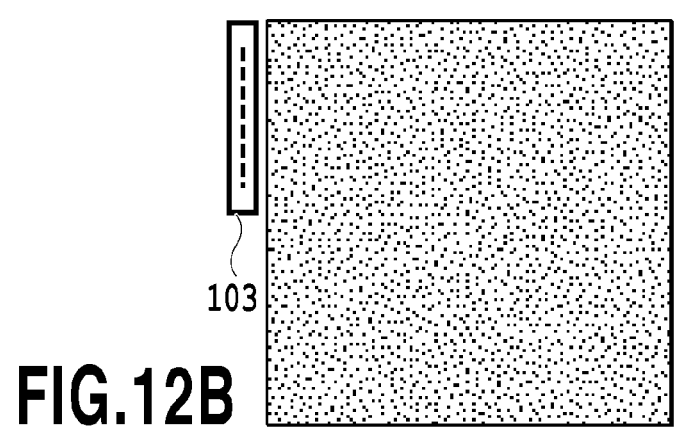
Figure 12C:
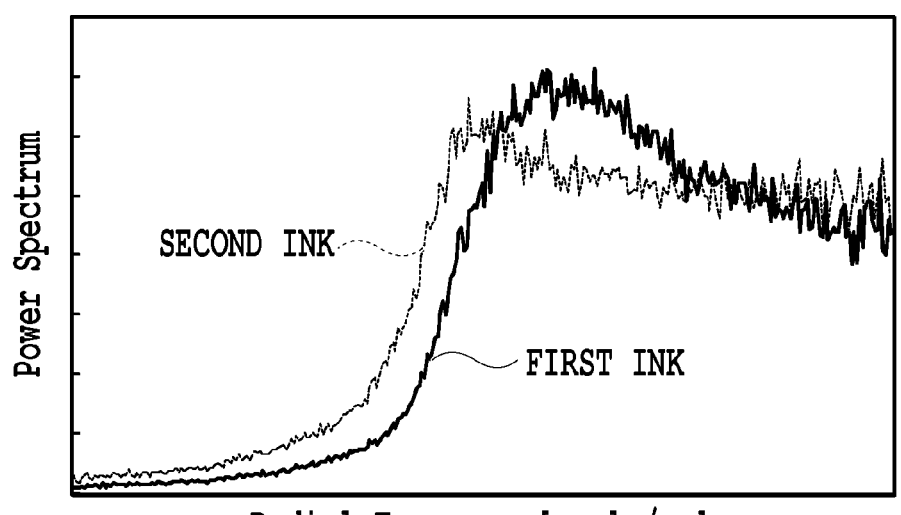

FIGS. 12A to 12C are diagrams respectively illustrating dot patterns and the frequency characteristics of the dot patterns when multi-valued data having the same value (34/255) is inputted for each of the first and second inks. When the multi-valued data (34/255) is inputted for the first ink, pixel positions where threshold values in the range of 0 to 33 in a threshold value matrix having arrayed threshold values of 0 to 254 are arranged are determined as printing (1). As a result, the print head having the multiple ejection ports arrayed in the Y direction ejects the ink in accordance with the print data while moving in the X direction, and thereby the dot pattern as illustrated in FIG. 12A is formed on a print medium.

On the other hand, when the multi-valued data (34/255) is inputted for the second ink, threshold values are offset by an amount corresponding to the multi-value data (34/255) with respect to the first ink in accordance with Expression 2-2. That is, in the case of the second ink, pixel positions where threshold values in the range of 34 to 66 among the threshold values of 0 to 254 are arranged are determined as printing (1). As a result, the dot pattern as illustrated in FIG. 12B is formed on the print medium.

Here, when comparing the dot pattern illustrated in FIG. 12A with that illustrated in FIG. 12B, it turns out that the former does not have any site where two dots are adjacently printed, whereas the latter has sites where two dots are adjacently printed. That is, the graininess of the dot pattern illustrated in FIG. 12A is perceived to be lower than that of the dot pattern illustrated in FIG. 12B.

FIG. 12C is a diagram comparing the frequency characteristics of these two dot patterns. Any of the dot patterns has blue noise characteristics characterized by a suppressed lower frequency component, a rapid rise, and a flat higher frequency component; however, the first ink more strongly exhibits the above distinctive features than the second ink.

In the present embodiment, it is assumed to use pigment inks of the four colors each prepared mainly from a pigment, dispersant, water-soluble solvent, and permeant. It is also assumed that the pigment inks are classified into a permeable pigment ink having relatively low surface tension and a lay-on type (low penetration type) pigment ink having relatively high surface tension. The surface tension of each of the colored inks is listed below.

Cyan (C): 34 [mN/m]
Magenta (M): 35 [mN/m]
Yellow (Y): 31 [mN/m]
Black (K): 39 [mN/m]

Figure 13A:
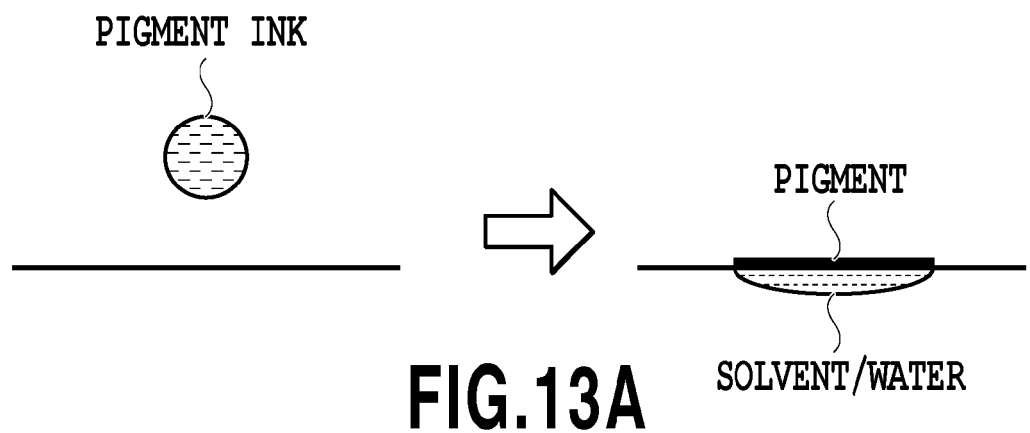
FIGS. 13A and 13B are diagrams illustrating pigment ink landing states on print media, respectively.

In the present embodiment, the black ink having relatively large surface tension among these four types of inks is set as the first ink. Also, the cyan, magenta, or yellow ink having relatively small surface tension is set as any of the second to fourth inks. More specifically, an ink having relatively large surface tension is likely to form a convex part in a landing state as in FIG. 13B. Accordingly, in order to print respective dots as separated as possible as in FIG. 13A, the ink is set as the first ink for which the quantization process resulting in high dispersibility is performed. On the other hand, an ink having relatively small surface tension is unlikely to form a convex part in a landing state as in FIG. 13B. Accordingly, the dispersibility of respective dots are not much focused on, and therefore the ink is set as any of the second to fourth inks for which the quantization process resulting in dispersibility inferior to the first ink is performed.

Figure 14A:
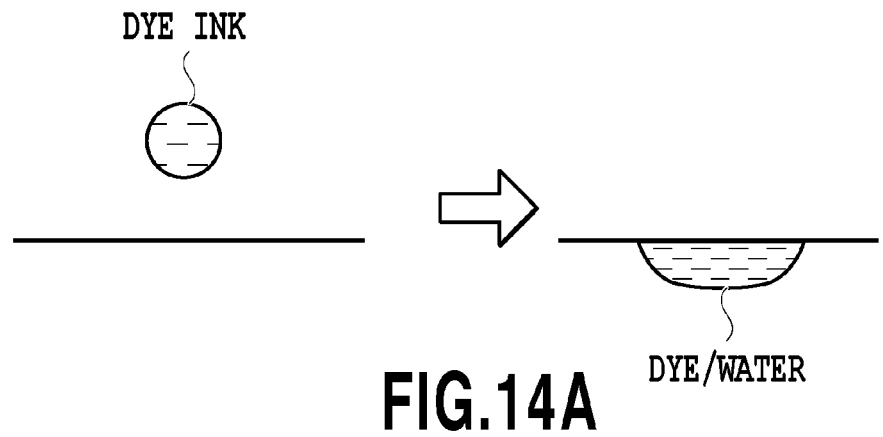
FIGS. 14A to 14C are diagrams for explaining the effect of a printing method.
Figure 14B:
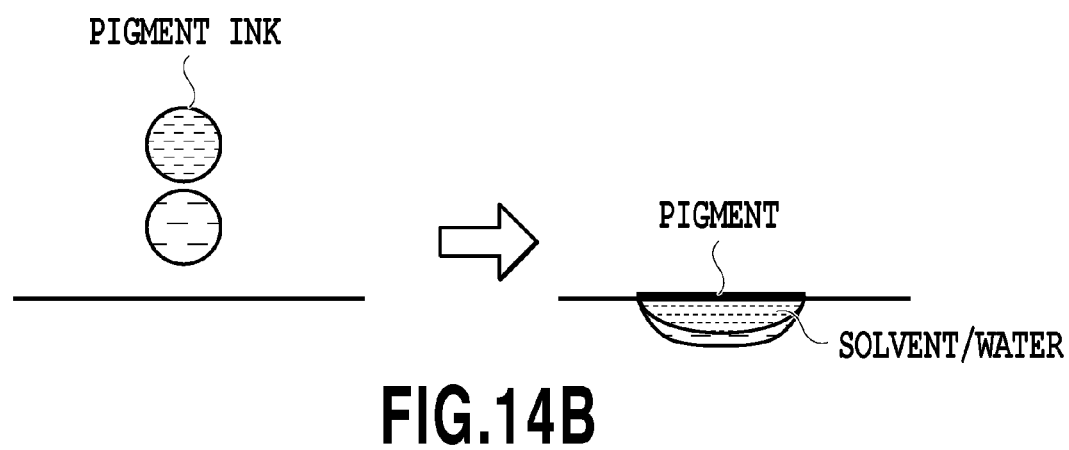
Figure 14C:
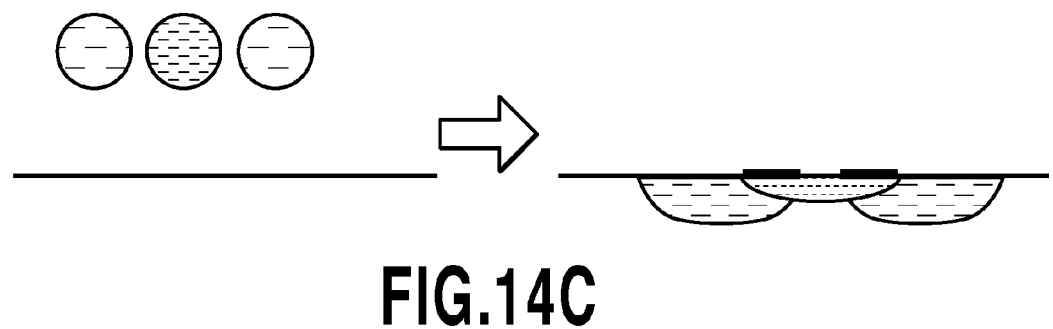

In doing so, in the case of the black ink having high surface tension, respective dots can be printed as separated as possible to smooth a landing state, and thereby rub resistance can be improved. Also, even in a situation where the black ink is printed with other inks mixed, the printing can be performed in a mutually exclusive state in a gradation range of intermediate density or less, and therefore at least the phenomena as illustrated in FIGS. 14B and 14C are unlikely to occur, making it possible to express the black color at high density. As a result, despite realizing a high density black image, a colored image superior in rub resistance can be outputted.

In addition, a method as described above may be used for offsetting a difference between the threshold value Dth(x, y) and the processing target data. For example, the quantization process unit 309 or further unit add a value corresponding to the threshold value offset value to the processing target data instead of subtracting the offset value inputted from the threshold value offset amount calculation unit 308 from the threshold value by the threshold value offset unit 309.
(Second embodiment)

In the present embodiment as well as in the first embodiment, an image process is performed in accordance with the flowchart in FIG. 6 using the inkjet printing system described with FIGS. 1 to 5. In addition, the quantization process described with FIGS. 7 and 8 is performed using the threshold value matrix described with FIG. 11.

In the present embodiment, inks different from those in the first embodiment are used. The first embodiment uses the pigment inks for all the colors; however, the present embodiment uses a pigment ink only for black, and uses dye inks for cyan, magenta, and yellow. To give a more specific description, in the case of black, high image density and sharpness are focused on, and therefore the pigment ink is used as a lay-on type ink having high surface tension. In the case of cyan, magenta, or yellow, an image having no bleed and uniformity are focused on, and therefore a dye ink is used as a permeable ink having lower surface tension than that in the first embodiment. In such an ink combination, in the present embodiment, the black ink is set as a first ink, and the cyan, magenta, or yellow ink is set as any of second to fourth inks.

In doing so, in the case of the black ink having high surface tension, respective dots can be printed as separated as possible to smooth an image surface, and thereby rub resistance can be improved. Also, even in a situation where the black ink is printed with the other dye inks mixed, the printing can be performed in a mutually exclusive state in a gradation range of intermediate density or less, and therefore at least the phenomena as illustrated in FIGS. 14B and 14C are unlikely to occur, making it possible to keep the black color at high density. In a gradation range of the intermediate density or more, the black ink may be printed at the same position as other inks; however, as described with FIG. 3, the printing apparatus in the present embodiment applies the inks on a print medium in the order of yellow→magenta-→cyan→black. Accordingly, the black ink printed in a higher gradation range is facilitated to permeate by the inks printed precedently as in FIG. 14B or 14C, and consequently an image surface becomes smooth.

Note that in the above, the combination of the lay-on type black pigment ink and the permeable colored dye inks is described; however, the present embodiment can also be applied to the case of printing a monotone image using multiple achromatic color inks such as black, gray, and light gray inks. In the case of using multiple achromatic color inks, in order to suppress graininess in a lower gradation range while increasing density in a higher gradation range, sometimes, a black ink is prepared from an lay-on type pigment ink, whereas a gray ink or a light gray ink is prepared from a permeable dye ink. Even in such a case, as long as the black ink is set as the first ink, and the gray ink or the light gray ink is set as any of the second to fourth inks, an image superior in rub resistance can be outputted while reducing graininess and achieving high density.

Third Embodiment

In the present embodiment as well as the above-described embodiments, the inkjet printing system described with FIGS. 1 to 5 is used, and an image process is performed in accordance with the flowchart in FIG. 6. In addition, the threshold value matrix described with FIG. 11 is used, and the quantization process described with FIGS. 7 and 8 is performed. The present embodiment is characterized by performing multipass printing to print an image.

Figure 15:
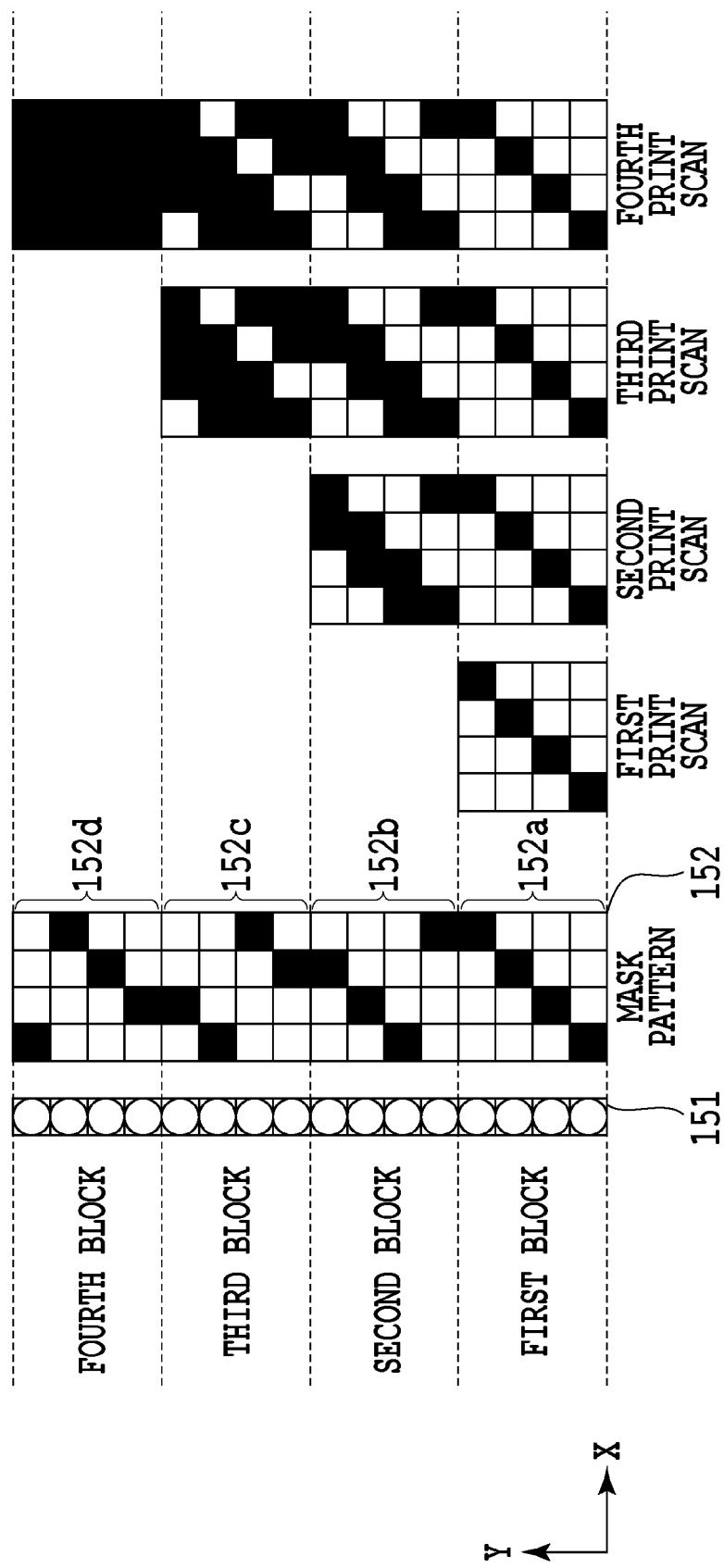
FIG. 15 is a schematic diagram for explaining a multipass printing method.

FIG. 15 is a schematic diagram for explaining a multipass printing method. The multipass printing is a printing method that performs multiple print scans of a print head to complete an image in a unit area of a print medium stepwise. The diagram illustrates the case of performing four-pass multipass printing using a print head 151 having 16 ejection ports arrayed in a Y direction. In the case of the four-pass multipass printing, multiple ejection ports are divided into four blocks, and therefore the 16 ejection ports are divided into four blocks each including four ejection ports. Also, during one print scan, in accordance with a predetermined mask pattern 152 for the print head, approximately one quarter of data to be printed are printed. In the diagram, a black pixel represents a print allowable pixel and a white pixel represents a print nonallowable pixel. After the print scan following such a mask pattern 152 has been finished, a print medium is conveyed in the Y direction by an amount corresponding to one block (four pixels) in the Y direction. Alternately repeating the print scan and the conveyance action as described above four times completes an image in the unit area.

In the case of performing a multipass printing, ejection data to be printed by each print scan is often determined using a mask pattern as described above. In the case of the four-pass multipass printing, four types of mask patterns 152$a$ to 152$d$, which have a mutually complementary relationship, are assigned to the respective blocks of a print head, and ANDed with print data to determine pieces of ejection data. In this case, if the dispersibility of each mask pattern is sufficiently high, the dispersibility of each piece of ejection data can be further increased.

In a higher gradation range, the print density of a black pigment ink also increases, and therefore even if a quantization process resulting in high dispersibility is performed, a situation where the pigment inks are adjacently printed inevitably occurs. Even in such a case, as long as the dispersibility of pigment inks actually printed by each print scan of multipass printing is high, a time from when one dot is printed to when another dot is printed at an adjacent position can be increased. That is, the fixation of a dot printed precedently is facilitated to some extent, and then a dot can be printed at an adjacent position, and therefore the degree of unevenness can be suppressed. Also, in the case where an ink other than the black pigment ink is a sufficiently high permeable ink as in the second embodiment, a time to apply the permeable ink can be interposed between a preceding dot and a succeeding dot. Accordingly, the effect of increasing the permeability of the black pigment ink as described with FIGS. 14B and 14C can also be expected.

Note that in the above, the multipass printing using the predetermined mask patterns is taken as an example to give the description; however, the multipass printing is not required to be configured to use preliminarily stored mask patterns. For example, it can also be configured to, after the color decomposition process described in Step S202 of FIG. 6, divide each piece of multi-valued data into planes corresponding to the number of passes, and then perform the processes after Step S203 for each of the planes.

Other Embodiments

In any of the above embodiments, the description is given on the basis of the configuration where one threshold value matrix common to respective colors is prepared, and the quantization process is performed for each of the colors while applying a different offset to threshold values in the matrix. This makes it possible to, in at least a lower gradation range, arrange dots of each of the colors in a high dispersion state and in a completely exclusive state. However, the present invention is not limited to such a configuration.

Figure 16A:
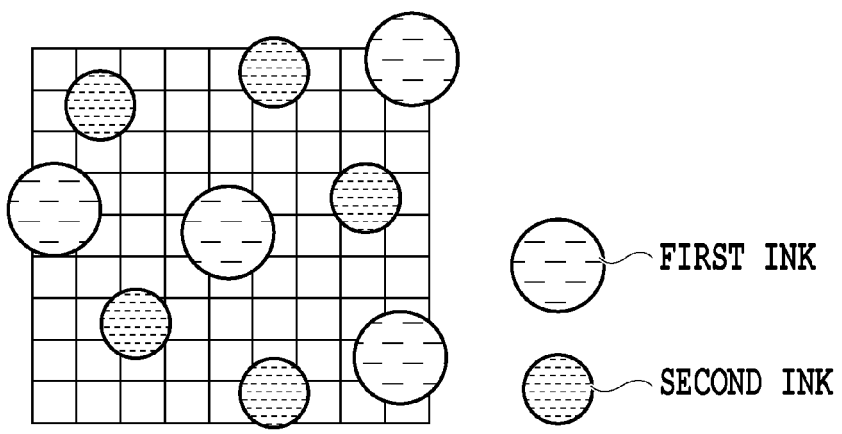
FIGS. 16A to 16C are diagrams for explaining dot arrangement states of first and second ink dots.
Figure 16B:
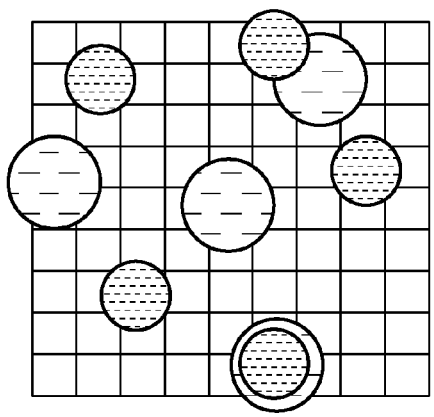
Figure 16C:
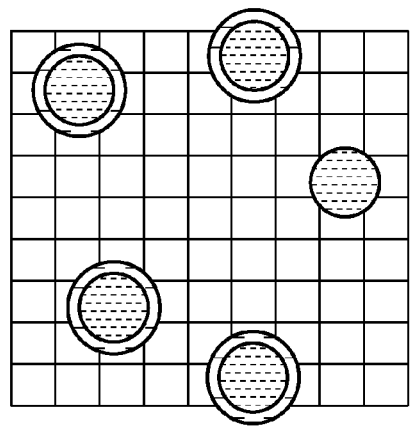

FIGS. 16A to 16C are diagrams for explaining dot arrangement states in the case of making a first ink and a second ink completely exclusive and in the cases not completely exclusive. FIG. 16A illustrates the case where as in the first embodiment, the first ink and the second ink have a completely exclusive relationship. In this case, any of between inks of the same color and between inks of different colors, neither dot overlap nor dot adjacency is present, and therefore an image having high rub resistance can be obtained.

Figure 13B:
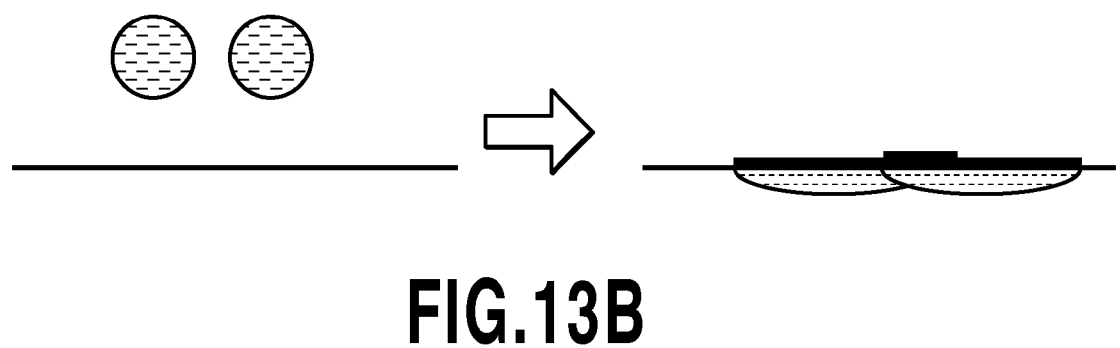

On the other hand, FIG. 16B illustrates the case where a threshold value matrix for the first ink and a threshold value matrix for the second ink are independently prepared. It is here assumed that the threshold value matrix for the first ink has higher dispersibility than that for the second ink, and between these two threshold value matrices, there is no correlation. In this case, a dot pattern of each of ink colors has high dispersibility. However, as seen in FIGS. 14B and 14C, in terms of the overlap of dots of the ink colors, sites where the dots are printed overlapping each other or adjacently to each other are present in places. Even in this case, by using a lay-on type ink having large surface tension as the first ink and a permeable ink having small surface tension as the second ink, at least the first ink can obtain high dispersibility, and prevent a convex part as illustrated in FIG. 13B from easily occurring. Also, in a site where a first ink dot and a second ink dot overlap each other, the permeable ink facilitates the permeation of the lay-on type ink, and therefore a concave part is unlikely to occur as well.

Further, FIG. 16C illustrates the case where the same threshold value matrix is used for the first ink and the second ink. In this case, the first ink and the second ink are printed at the same position regardless of gradation. Even in such a case, by using a lay-on type ink having large surface tension as the first ink and a permeable ink having small surface tension as the second ink, the effect of the present invention can be obtained. That is, as long as the threshold value matrix used for the lay-on type ink has sufficiently high dispersibility, at least a convex part caused by the overlap of lay-on type ink dots as illustrated in FIG. 13B is unlikely to occur. In addition, even in the case where the lay-on type ink and the permeable ink are printed overlapping each other, as described with FIGS. 14A to 14C, the permeable ink facilitates the permeation of the lay-on type ink, and therefore a convex part is unlikely to occur as well. That is, as long as a quantization process resulting in high dispersibility is performed at least for the lay-on type ink, regardless of a quantization process used for the other permeable ink, the smoothness of the surface of an image can be kept to improve the rub resistance of the image.

However, in order to sufficiently fulfil the distinctive feature of the lay-on type ink, i.e., realizing a high density image, in addition to the improvement of the rub resistance, performing a quantization process that makes the permeable ink exclusive with respect to the lay-on type ink is preferable after all. This case requires the conditions where the dispersibility of the lay-on type ink is high, and the permeable ink is printed at a position exclusive with respect to the lay-on type ink. However, even in this case, the dispersibility of permeable ink dots and the overlap relationship between permeable ink dots are not particularly limited. As threshold value matrices, uncorrelated independent ones can also be prepared for the respective ink colors.

In this case, the quantization process is not limited to the dither process. For example, it can also be configured to perform an error diffusion process resulting in high dispersibility for the lay-on type ink, and perform the quantization process for the other permeable ink while referring to a result of the quantization for the lay-on type ink. That is, by performing the quantization process for the permeable ink such that a position different from a position determined as "printing" for the lay-on type ink corresponds to "printing", the same effect as above can be obtained. In either case, as long as it is configured to perform a quantization process different for each of multiple ink colors having different surface tensions, the present invention can be realized.

Further, in the above, the inkjet printing system basically using cyan, magenta, yellow, and black is described; however, obviously, the present invention is not limited to such an ink combination. It can also be configured to further include, in addition to a gray ink, a particular color ink such as red, green, or blue ink, or light cyan or light magenta ink of which color material density is lower than that of the cyan or magenta ink. Also, the above description is given on the basis of the configuration where the surface tension of the black ink is the highest; however, obviously, the present invention is not limited to such a configuration. It can also be configured to use a highest surface tension pigment ink of a chromatic color as a chromatic color ink, and use the chromatic color ink together with a black dye ink having lower surface tension than the chromatic color ink. In this case, the dispersibility of the chromatic color ink is most focused on, and therefore it is only necessary that the chromatic color ink is set as a first ink, and the black dye ink is set as any of second to fourth inks.

Also, the above description is given on the basis of the configuration where 16-bit data is quantized into several levels by the quantization process, and then a dot pattern corresponding to a level is related by the index expansion process; however, a way to express a multi-valued level is not limited to the index expansion. In the case where dots having multiple sizes are printable, or in the case where inks having multiple different densities are ejectable, printing can also be performed with a dot size or ink density related to each level. Even in the case of expressing a quantized level value in any manner, a dot array state depends on a quantization process result. That is, even in the case of expressing a quantized level value in any manner, by setting a quantization process resulting in relatively high dispersibility for an ink of which a satellite is relatively conspicuous, the effect of the present invention can be sufficiently obtained.

In addition, the quantization process performed in Step S203 is not necessarily required to be a multi-valued quantization process that converts to several-bit multi-valued data. That is, the quantization process in Step S203 may directly convert 16-bit gradation data to 1-bit binary data through a dither process. In this case, the index expansion process described in Step S204 is omitted, and binary data obtained in Step S203 is directly outputted to the printing apparatus 1. Obviously, a bit number of input/output data in any of the other steps of FIG. 2 is not limited to that in the above-described embodiments. In order to keep accuracy, an output bit number may be made larger than an input bit number, and a bit number may be variously adjusted depending on application or situations.

Further, the above embodiments are described using the printing apparatus of a serial type illustrated in FIG. 2; however, the present invention is also applicable to a full line type printing apparatus. Also, the above embodiments are described on the basis of the configuration where all the steps illustrated in FIG. 3 are performed in the image processing apparatus 2; however, as long as each of the above processes is performed in the inkjet printing system of the embodiments illustrated in FIG. 1, the steps may be performed in any device. For example, a configuration where the steps up to the quantization in Step S203 are performed by the image processing apparatus 2, and the index process in Step S204 is performed in the printing apparatus 1 is also possible. Also, it may be configured that the printing apparatus 1 includes the functions of the image processing apparatus 2 described above, and all the steps subsequent to Step S201 are performed in the printing apparatus 1. In this case, the printing apparatus 1 serves as the image processing apparatus of the present invention.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254029 filed Dec. 16, 2014, which is hereby incorporated by reference wherein in its entirety.

What is claimed is:

1. An image processing apparatus for printing an image on a print medium by using a printing unit that ejects a first ink in accordance with first quantized data and ejects a second ink in accordance with second quantized data, the image printing apparatus comprising:
   a first quantization configured to quantize multi-valued data corresponding to the first ink to generate the first quantized data, the multi-valued data indicating intermediate density; and
   a second quantization unit configured to quantize multi-valued data corresponding to the second ink to generate the second quantized data, the multi-valued data indicating intermediate density, wherein:
   surface tension of the first ink is larger than surface tension of the second ink, and
   a first dot pattern printed on the print medium in accordance with the first quantized data has higher dispersibility than a second dot pattern printed on the print medium in accordance with the second quantized data.

2. The image processing apparatus according to claim 1, wherein the first quantization unit and the second quantization unit generate the first quantized data indicating printing or non-printing of dot and the second quantized data indicating printing or non-printing of dot by comparing the multi-valued data corresponding to the first ink and the multi-valued data corresponding to the second ink with corresponding threshold values, respectively.

3. The image processing apparatus according to claim 2, wherein:
   the first quantization unit and the second quantization unit refer to a same threshold value matrix in which multiple threshold values are arrayed;
   the first quantization unit performs a quantization process by comparing the multi-valued data corresponding to the first ink with a threshold value stored in the threshold value matrix; and
   the second quantization unit performs the quantization process by comparing the multi-valued data corresponding to the second ink with a threshold value resulting from applying an offset to the threshold value compared by the first quantization unit according to the multi-valued data corresponding to the first ink.

4. The image processing apparatus according to claim 3, wherein the threshold value matrix has a blue noise characteristic.

5. The image processing apparatus according to claim 3, wherein the threshold value matrix is formed so as to keep low frequency power lower than high frequency power in the first dot pattern and the second dot pattern.

6. The image processing apparatus according to claim 3, wherein the second quantization unit performs the quantization process by comparing the multi-valued data corresponding to the second ink with a threshold value obtained by subtracting a value according to the multi-valued data corresponding to the first ink from the threshold value compared by the first quantization unit.

7. The image processing apparatus according to claim 2, wherein the first quantization unit and the second quantization unit refer to mutually different threshold value matrices each other in which multiple threshold values are arrayed, and perform the quantization process of the multi-valued data corresponding to the first ink and the quantization process of the multi-valued data corresponding to the second ink, respectively.

8. The image processing apparatus according to claim 7, wherein the threshold value matrices have blue noise characteristics, respectively.

9. The image processing apparatus according to claim 7, wherein the threshold value matrices are formed so as to keep low frequency power lower than high frequency power in the first dot pattern and the second dot pattern.

10. The image processing apparatus according to claim 1, wherein the first dot pattern and the second dot pattern are mutually exclusive in a low gradation range.

11. The image processing apparatus according to claim 1, wherein:
the first quantization unit employs an error diffusion method, and
the second quantization unit refers to a result by the first quantization unit to generate the second quantized data such that the first dot pattern and the second dot pattern are mutually exclusive in a low gradation range.

12. The image processing apparatus according to claim 1, wherein the first ink is a black ink, and the second ink is a colored ink.

13. The image processing apparatus according to claim 1, wherein the first ink is a pigment ink, and the second ink is a dye ink.

14. The image processing apparatus according to claim 13, wherein the first ink is a black pigment ink and the second ink is a black dye ink.

15. The image processing apparatus according to claim 1, further comprising a unit configured to convert the first quantized data into the first dot pattern and converts the second quantized data into the second dot pattern with use of a dot arrangement pattern in which dot arrangement is predetermined in an area corresponding to a pixel.

16. The image processing apparatus according to claim 1, further comprising the printing unit that ejects the first ink in accordance with the first quantized data and ejects the second ink in accordance with the second quantized data.

17. An image processing apparatus for printing an image on a print medium by using a printing unit that ejects a first ink in accordance with first quantized data and ejects a second ink in accordance with second quantized data, the image printing apparatus comprising:
a first quantization unit configured to quantize multi-valued data corresponding to the first ink to generate the first quantized data; and
a second quantization unit configured to quantize multi-valued data corresponding to the second ink to generate the second quantized data,
wherein:
a surface tension of the first ink is larger than a surface tension of the second ink,
the first quantization unit and the second quantization unit generate the first quantized data indicating printing or non-printing of a dot and the second quantized data indicating printing or non-printing of a dot by comparing the multi-valued data corresponding to the first ink and the multi-valued data corresponding to the second ink with corresponding threshold values, respectively;
the first quantization unit and the second quantization unit refer to a same threshold value matrix in which multiple threshold values are arrayed;
the first quantization unit performs a quantization process by comparing the multi-valued data corresponding to the first ink with a threshold value stored in the threshold value matrix; and
the second quantization unit changes a difference between the multi-valued data corresponding to the second ink and a threshold value in the threshold value matrix according to the multi-valued data corresponding to first ink and then performs the quantization process for the multi-valued data corresponding to the second ink.

18. The image processing apparatus according to claim 17, wherein the second quantization unit performs the quantization process by comparing the multi-valued data corresponding to the second ink with a threshold value resulting from applying an offset to the threshold value compared by the first quantization unit according to the multi-valued data corresponding to the first ink.

19. The image processing apparatus according to claim 18, wherein the second quantization unit performs the quantization process by comparing the multi- valued data corresponding to the second ink with a threshold value resulting from subtracting the multi-valued data corresponding to the first ink from the threshold value compared by the first quantization unit.

20. The image processing apparatus according to claim 17, wherein the threshold value matrix has a blue noise characteristic.

21. The image processing apparatus according to claim 17, wherein the first ink is an achromatic color ink and the second ink is a chromatic color ink.

22. The image processing apparatus according to claim 21, wherein the first ink is a black ink and the second ink is a color ink.

23. The image processing apparatus according to claim 17, wherein the first ink is a pigment ink and the second ink is a dye ink.

24. The image processing apparatus according to claim 23, wherein the first ink is a black pigment ink and the second ink is a black dye ink.

25. The image processing apparatus according to claim 17, wherein the first quantized data and the second quantized data are three or more levels data and the image processing apparatus further comprises:
a unit configured to convert the first quantized data into a first dot pattern data and converts the second quantized data into a second dot pattern data with use of a dot arrangement pattern in which the dot arrangement is predetermined in an area corresponding to a pixel.

26. The image processing apparatus according to claim 17, further comprising the printing unit that ejects the first ink in accordance with the first quantized data and ejects the second ink in accordance with the second quantized data.

27. An image processing method executed by an image printing apparatus for printing an image on a print medium by using a printing unit that ejects a first ink in accordance with first quantized data and ejects a second ink in accordance with second quantized data, the image printing method comprising:
a first quantization step of quantizing multi-valued data corresponding to the first ink to generate the first quantized data; and a second quantization step of quantizing multi-valued data corresponding to the second ink to generate the second quantized data, wherein:

a surface tension of the first ink is larger than a surface tension of the second ink;

the first quantization step and the second quantization step generate the first quantized data indicating printing or non-printing of a dot and the second quantized data indicating printing or non-printing of a dot by comparing the multi-valued data corresponding to the first ink and the multi-valued data corresponding to the second ink with corresponding threshold values, respectively;

the first quantization step and the second quantization step refer to a same threshold value matrix in which multiple threshold values are arrayed;

the first quantization step performs a quantization process by comparing the multi-valued data corresponding to the first ink with a threshold value stored in the threshold value matrix; and the second quantization step changes a difference between the multi-valued data corresponding to the second ink and a threshold value in the threshold value matrix according to the multi-valued data corresponding to first ink and then performs the quantization process for the multi-valued data corresponding to the second ink.

28. The image processing method according to claim 27, wherein the second quantization step performs the quantization process by comparing the multi-valued data corresponding to the second ink with a threshold value resulting from applying an offset to the threshold value compared by the first quantization unit according to the multi-valued data corresponding to the first ink.

29. The image processing method according to claim 28, wherein the second quantization step performs the quantization process by comparing the multi-valued data corresponding to the second ink with a threshold value obtained by subtracting the multi-valued data corresponding to the first ink from the threshold value compared by the first quantization step.

* * * * *